United States Patent
Voss et al.

(10) Patent No.: US 7,673,448 B2
(45) Date of Patent: Mar. 9, 2010

(54) DIESEL EXHAUST ARTICLE AND CATALYST COMPOSITIONS THEREFOR

(75) Inventors: Kenneth E. Voss, Somerville, NJ (US); Kevin Hallstrom, Clinton, NJ (US); Ramesh M. Kakwani, Whitehouse Station, NJ (US); Shiang Sung, New York, NY (US)

(73) Assignee: BASF Catalysts LLC, Florham Park, NJ (US)

( * ) Notice: Subject to any disclaimer, the term of this patent is extended or adjusted under 35 U.S.C. 154(b) by 203 days.

(21) Appl. No.: 11/495,432

(22) Filed: Jul. 28, 2006

(65) Prior Publication Data

US 2007/0041881 A1 Feb. 22, 2007

Related U.S. Application Data

(60) Provisional application No. 60/705,823, filed on Aug. 5, 2005.

(51) Int. Cl.
*F01N 3/00* (2006.01)

(52) U.S. Cl. .............. 60/297; 60/295; 60/299; 60/311; 55/DIG. 30; 55/524; 422/177; 422/178; 422/190

(58) Field of Classification Search ............ 60/274, 60/295, 297, 299, 311; 55/DIG. 30, 523, 55/524; 422/177, 178, 190, 277, 187
See application file for complete search history.

(56) References Cited

U.S. PATENT DOCUMENTS

| | | |
|---|---|---|
| 3,111,396 A | 11/1963 | Ball |
| 4,264,347 A | 4/1981 | Shintani et al. |
| 4,426,320 A | 1/1984 | Ernest et al. |
| 4,426,347 A | 1/1984 | Cornell et al. |
| 4,451,441 A | 5/1984 | Ernest et al. |
| 4,510,265 A | 4/1985 | Hartwig |
| 4,535,588 A | 8/1985 | Sato et al. |
| 4,828,807 A | 5/1989 | Domesle et al. |
| 4,902,487 A | 2/1990 | Cooper et al. |
| 5,057,483 A | 10/1991 | Wan |
| 5,067,320 A | 11/1991 | Kanesaki |
| 5,462,907 A | 10/1995 | Farrauto et al. |

(Continued)

FOREIGN PATENT DOCUMENTS

| | | |
|---|---|---|
| EP | 0 142 858 | 11/1984 |
| EP | 0 154 145 | 1/1985 |
| EP | 1 484 484 A1 | 12/2004 |
| GB | 1014498 | 10/1962 |
| JP | 58067914 | 4/1983 |

(Continued)

OTHER PUBLICATIONS

"Emission Control of Diesel-Fueled Vehicles, Status Report," Manufacturers of Emission Controls Association, Jun. 1995, pp. 1-18.

*Primary Examiner*—Binh Q Tran
(74) *Attorney, Agent, or Firm*—Stuart D. Frenkel; Frenkel & Associates, P.C.; Melanie L. Brown

(57) ABSTRACT

A self-cleaning diesel exhaust particulate filter system is disclosed wherein burn-off of collected particulate matter is accomplished at normal exhaust gas temperatures, the filter system being provided with a catalyst mixture of a co-formed ceria-zirconia composite and, optionally, a base metal oxide, the presence of which allows regeneration of filters at temperatures that are readily achieved in diesel exhaust systems, including operating conditions that are at low load where lower exhaust temperatures exist.

15 Claims, 21 Drawing Sheets

U.S. PATENT DOCUMENTS

| | | | |
|---|---|---|---|
| 5,491,120 | A | 2/1996 | Voss et al. |
| 5,655,212 | A * | 8/1997 | Sekhar et al. ............... 428/552 |
| 5,709,722 | A | 1/1998 | Nagai et al. |
| 5,746,989 | A | 5/1998 | Murachi et al. |
| 5,787,706 | A | 8/1998 | Smedler et al. |
| 5,898,014 | A | 4/1999 | Wu et al. |
| 6,077,060 | A | 6/2000 | Watanabe |
| 6,171,556 | B1 | 1/2001 | Burk et al. |
| 6,248,684 | B1 | 6/2001 | Yavuz et al. |
| 6,255,249 | B1 | 7/2001 | Voss et al. |
| 6,294,141 | B1 | 9/2001 | Twigg et al. |
| 6,316,121 | B1 | 11/2001 | Maus |
| 6,361,579 | B1 | 3/2002 | Itoh et al. |
| 6,375,910 | B1 | 4/2002 | Deeba et al. |
| 6,423,293 | B1 | 7/2002 | Chun et al. |
| 6,516,611 | B1 * | 2/2003 | Schafer-Sindlinger et al. ........................ 60/297 |
| 6,534,021 | B1 * | 3/2003 | Maus ........................ 422/180 |
| 6,576,032 | B2 | 6/2003 | Maus |
| 6,712,884 | B2 | 3/2004 | Bruck et al. |
| 6,810,660 | B2 | 11/2004 | Hepburn et al. |
| 6,823,666 | B2 | 11/2004 | Odendall |
| 6,916,450 | B2 * | 7/2005 | Akama et al. ............... 422/180 |
| 6,946,013 | B2 * | 9/2005 | Alward et al. ................ 55/523 |
| 7,052,532 | B1 * | 5/2006 | Liu et al. ....................... 96/154 |
| 7,078,004 | B2 * | 7/2006 | Voss et al. ............... 423/213.5 |
| 7,138,358 | B2 * | 11/2006 | Huang et al. ................ 502/326 |
| 7,204,965 | B2 * | 4/2007 | Okawara et al. ............ 422/177 |
| 7,258,825 | B2 * | 8/2007 | Boretto et al. ................ 264/43 |
| 7,267,805 | B2 * | 9/2007 | Bruck et al. ................ 422/180 |
| 2001/0001647 | A1 | 5/2001 | Leyrer et al. |
| 2001/0046941 | A1 | 11/2001 | Mussmann et al. .......... 502/304 |
| 2002/0033017 | A1 | 3/2002 | Bruggermann et al. |
| 2002/0054843 | A1 | 5/2002 | Maunula |
| 2003/0108465 | A1 | 6/2003 | Voss et al. |
| 2003/0124037 | A1 | 7/2003 | Voss et al. |
| 2004/0028587 | A1 | 2/2004 | Twigg |
| 2004/0144069 | A1 | 7/2004 | Gabe et al. |
| 2004/0166036 | A1 | 8/2004 | Chen et al. |
| 2005/0054526 | A1 | 3/2005 | Steinke et al. |
| 2006/0039843 | A1 * | 2/2006 | Patchett et al. ........... 423/239.1 |

FOREIGN PATENT DOCUMENTS

| | | |
|---|---|---|
| JP | 11257048 | 9/1999 |
| JP | 2002054423 | 2/2002 |
| WO | WO 96/06814 | 3/1996 |
| WO | WO 99/56853 | 11/1999 |

* cited by examiner

DIESEL EXHAUST ARTICLE AND CATALYST COMPOSITIONS THEREFOR

CROSS REFERNCE TO RELATED APPLICATION

This application claims priority to U.S. Provisional Application No. 60/705,823, filed Aug. 5, 2005, entitled "Diesel Exhaust Article and Catalyst Compositions Therefor".

FIELD OF THE INVENTION

The present invention relates to an article and catalyst compositions-for the reduction of harmful exhaust emission from diesel engines, and more particularly to an article for increasing the effectiveness of the oxidation of the particulate components in exhaust emissions.

BACKGROUND OF THE INVENTION

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. The total particulate matter ("TPM") emissions are comprised of three main components. One component is the carbonaceous fraction or soot fraction. This dry carbonaceous matter contributes to the visible soot emissions commonly associated with diesel exhaust.

A second component of the TPM is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust, and is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulates is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in current use for high level particulate reduction is the diesel particulate filter. There are many known filter structures that can be used to remove particulates from diesel exhaust, including honeycomb wall flow filters, wound or packed fiber filters, open cell foams, sintered metal filters, etc. However, ceramic wall flow filters that are described below have received the most attention. These filters are capable of removing over 90% of the particulate material from diesel exhaust. The filter is a physical structure for removing particles from exhaust. As particles accumulate on the filter, an increase in the back pressure from the filter on the engine arises. Thus, the accumulating particles have to be continuously or periodically burned out of the filter to maintain an acceptable back pressure. Unfortunately, the carbon soot particles require temperatures in excess of 500 to 550° C. to be combusted under oxygen rich (lean) exhaust conditions. This is a higher temperature than is typical of diesel exhaust temperatures. Provisions are generally introduced to lower the soot burning temperature in order to provide for passive regeneration of the filter. The presence of a catalyst has been found to promote soot combustion and thereby regeneration of the filters at temperatures accessible within the diesel engine's exhaust under realistic duty cycles. In this way a catalyzed soot filter (CSF) or catalyzed diesel particulate filter (CDPF) can be an effective method to provide for >90% particulate reduction along with passive burn-out of the accumulating soot, and thereby filter regeneration.

A frequent problem that plagues use of less porous CSFs is caused by too rapid a build up of the particulate matter on the filter, particularly at lower diesel exhaust temperatures. Lower diesel exhaust temperatures are observed, for example, under conditions of low load and at startup. At lower diesel exhaust temperatures, the catalysts disposed on the filter are less effective at catalyzing the combustion of the particulate matter collected on the filter, and back pressure in the exhaust system increases. Various strategies have been implemented in the past that seek to address buildup of particulate on CSFs and subsequent buildup of back pressure, and are described below.

U.S. Pat. No. 4,902,487, for example, discloses a process for treatment of diesel exhaust wherein the exhaust is passed through a filter to remove particulate therefrom before discharge, and the particulate deposited on the filter is combusted with a gas containing nitrous oxide ($NO_2$) that is catalytically generated in the exhaust stream. Putting a catalyst upstream of the filter is disclosed to accomplish this. The upstream catalyst is disclosed to produce $NO_2$ in a diesel exhaust stream, which contains nitric oxide (NO).

GB 1,014,498 discloses methods and apparatus for filtering and purifying internal combustion engine exhaust containing solid particles. The speed of the exhaust is progressively reduced by passing the gases radially outward through a first filter of a pellet type oxidation catalyst adapted to retain the larger of the particles, and then radially outward through a second filter surrounding the first filter and adapted to retain smaller sized particles. The first filter is composed of pellets that are refractory and attrition resistant and that are impregnated with active catalyst substance (e.g., alumina grains impregnated by cobalt oxide ($Co_2O_4$) having a diameter of 1.5 to 5 mm). The second filter is composed of synthetic fibers although other materials can be used to form the second filter.

U.S. Pat. No. 4,510,265 describes a self-cleaning diesel exhaust particulate filter which contains a catalyst mixture of a platinum group metal and silver vanadate, the presence of which is disclosed to lower the temperature at which ignition and incineration of the particulate matter is initiated. Filters are disclosed to include thin porous walled honeycombs (monoliths) or foamed structures through which the exhaust gases pass with a minimum pressure drop. Disclosed useful filters are made from ceramics, generally crystalline, glass ceramics, glasses, metals, cements, resins or organic polymers, papers, textile fabrics and combinations thereof.

U.S. Pat. No. 4,426,320 ("the '320 patent") discloses a method whereby carbon and lead particles are removed from internal combustion exhaust by passing the gases through a course filter and then through a fine filter. The use of a relatively coarse filter in front of a fine filter is said to allow the coarse filter to remove larger particles before the gases reach the second fine filter, and also to extend the life of the fine filter. The filter configuration is described to reduce the rate at which back pressure increases as the particles accumulate in the filters. Deposited on the filters are catalyst materials effective for conversion of one or more pollutants in the exhaust to innocuous entities and removing suspended particles in the gas. A preferred filter is disclosed to be an open cell ceramic foam filter.

Catalyst materials disclosed in the '320 patent that are suitable for the combustion of carbon particles include an element of the first transition series such as vanadium, chromium, manganese, iron, cobalt, nickel, copper and zinc. Compositions disclosed in the '320 patent are also useful in conversion of hydrocarbons, carbon-monoxide and nitrogen oxide pollutants. Such catalyst materials are said to have a noble metal, an element of the first transition series, and mixtures thereof.

The '320 patent describes the deposition of the catalyst materials directly on the ceramic foam supports by means of (1) impregnating the filter with a water-soluble, thermally decomposable inorganic salt or complex of the metal or metals; (2) drying the impregnated filter; and (3) then calcining the dried filter. Alternatively, the catalyst materials can be supported on a porous, refractory inorganic oxide.

U.S. Pat. No. 4,535,588 ("the '588 patent") discloses the use of a carbon particulate cleaning device that has an embodiment wherein two different filters having different air permeability with each other are serially arranged. Filters of stainless steel wool are described, with the filter of higher air permeability being positioned at the upstream side of the second filter of relatively lower air permeability. In alternative embodiments, ceramic or metallic foam filters, having different air-permeability, replace the stainless steel wool filters. The filters can be coated with oxidizing catalysts, such as platinum, palladium and rhodium.

U.S. Pat. No. 4,828,807 ("the '807 patent") discloses the use of serially arranged filter elements installed in the cross section of a housing traversed by the exhaust, wherein at least one filter element carrying a catalyst that lowers the ignition temperature of the soot and assists in soot burn off alternates several times with at least one filter element carrying a catalyst that assists in the combustion of gaseous pollutants. Filter elements that can be used include filtered disks sintered into open porosity, disks from pressed ceramic fibers, particularly fibers of $Al_2O_3$, $SiO_2$, aluminum silicate, or $ZrO_2$; disks formed from sintered metal; disks formed from pressed steel wool; packed beds of temperature resistant ceramic or metallic material. A number of catalysts are disclosed in the '807 patent which assist in the ignition and burn off of the particulates. These catalysts include (a) lithium oxide; (b) vanadium pentoxide; (c) vanadium pentoxide plus an oxide of one or more of 37 disclosed elements, which elements include lanthanum, cerium, praseodymium, neodymium and zirconium; (d) vanadate of one or more of the metals listed under (c); and (e) perrhenate, preferably of lithium, potassium, silver or vanadium. The catalysts are disclosed to be combined with a carrier material which can be MgO, $Al_2O_3$, $CeO_2$, $SnO_2$, $TiO_2$, $ZrO_2$, $HfO_2$, $ThO_2$, $Nb_2O_5$, $WO_3$, magnesium silicate, aluminum silicate and/or magnesium titanate and combinations thereof.

The '807 patent also describes catalysts that assist in the combustion of gaseous pollutants which are coated on at least one of the filter elements to include one or more elements of the platinum group, optionally together with one or more base metals in combination with a temperature resistant carrier material. Preferred carrier materials include MgO, $Al_2O_3$, particularly $\gamma$-$Al_2O_3$, $CeO_2$, $SiO_2$, $SnO_2$, $TiO_2$, $ZrO_2$, $HfO_2$, $ThO_2$, $Nb_2O_5$, $WO_3$, magnesium silicate, aluminum silicate and/or magnesium titanate or combinations thereof. The carrier material is mixed either with the catalyst or applied to the filter element, and serves as a base for the catalyst.

SUMMARY OF THE INVENTION

The present invention relates to an article for increasing the effectiveness of the oxidation of the particulate component in diesel exhaust emissions. The present invention is obtained with at least one upstream filter in communication with at least one downstream filter for collection, and subsequent combustion of the particulate matter. Both the at least one upstream filter and at least one downstream filter have a catalytic composition comprising a co-formed ceria-zirconia composite dispersed thereon.

DETAILED DESCRIPTION OF THE INVENTION

The article of the invention achieves greater reductions in the diesel particulate emissions than through the use of conventional wall flow substrates alone. In addition, the article achieves particulate reductions by using a filter system that allows regeneration of filters at temperatures that are readily achieved in diesel exhaust systems, including operating conditions that are at low load where lower exhaust temperatures exist (i.e. <500° C.). Accordingly, the filters in the exhaust article of the invention have significantly less propensity to clog due to the accumulation of particulate matter.

The exhaust article has at least one upstream filter in communication with at least one downstream filter for the collection, and subsequent combustion of the particulate matter. Each of the upstream and downstream filters contains a catalyst composition that lowers the temperature at which the particulate is combusted, and it also facilitates the oxidation of gaseous pollutants in the exhaust. The upstream filter may be an open cell foam filter that is characterized by a low efficiency so that only a portion of the total particulate in the exhaust is collected on the upstream filter. In an alternative embodiment, the upstream filter can be a perforated metal foil. The uncollected soot is then collected in one or more filters that are downstream of the upstream configuration. This configuration contrasts with conventional exhaust articles that typically rely on use of a single high efficiency soot filter, such as a catalyst coated, honeycomb-type wall flow filter, to trap and combust the particulate in the exhaust stream.

Figure 1:
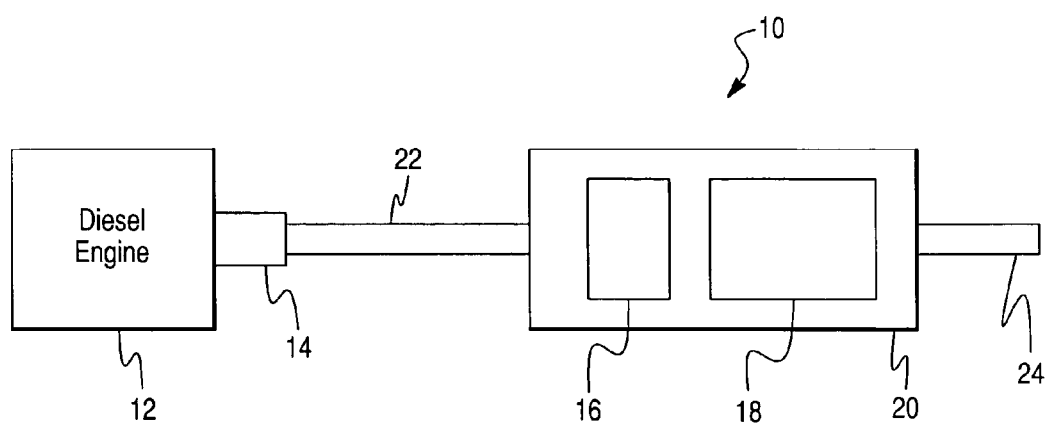
FIG. 1 depicts one embodiment of the article of invention having an upstream soot filter and a downstream soot filter contained within a single canister.

FIG. 1 is a schematic depiction of one embodiment of the exhaust article of the invention indicated by reference numeral 10 and used in conjunction with a diesel engine. As shown, a diesel engine 12 having an engine exhaust outlet 14 is in fluid communication with exhaust article 10 of this invention. Exhaust article 10 includes an upstream soot filter 16 (which may be a catalyzed open cell foam filter), which is in fluid communication with a downstream soot filter 18. In this embodiment, a single canister 20 houses both the upstream and downstream soot filters 16 and 18. The canister 20 contains an inlet 22 for receiving diesel exhaust from engine outlet 14 and an outlet 24 in fluid communication with downstream filter 18.

During operation of diesel engine 12, diesel exhaust stream containing particulate and gaseous pollutants flows from the engine outlet 14 along the length of the exhaust article 10. The exhaust stream first passes through the upstream soot filter 16 whereupon at least some of the particulate in the exhaust stream will collect on the upstream soot filter 16. The exhaust stream then passes through to the downstream soot filter 18 where further particulate material collects on filter 18 and is removed from the exhaust stream. Catalyst compositions are coated on each of the upstream and downstream filters 16 and 18 to promote the combustion of soot to regenerate the respective filters. The catalyst coating compositions are effective in lowering the temperature at which the particulate, and in particular the soot fraction, combusts. The catalyst compositions therefore are useful in regenerating the filters, and reduce the back pressure in the exhaust article due to the soot collected on the filters. The compositions deposited on the soot filters additionally convert gaseous pollutants in the exhaust stream to innocuous gaseous products (e.g., carbon dioxide, water).

Use of a low efficiency filter as the upstream filter (e.g., an open cell foam or perforated metal foil filter) results in reduced quantities of particulate collected on the catalyst coated filter compared to quantities that would be collected on a higher efficiency filter. By "low efficiency" it is meant that the filter removes less than 50 wt. % of the particulate in the exhaust stream or typically less than 20 wt. % of the particulate in the exhaust stream. For instance for a open cell foam filter having a pore diameter of 0.08 in. and a web diameter of 0.01 in., a porosity of about 5 ppi achieves such low efficiency of particulate collection. Due to reduced particulate collection on the filter, lower temperatures can-be used to combust the accumulated particulate than would be needed for thicker deposits of particulate on the filter. The use of the upstream-catalyzed filter also reduces the amount of particulate that needs to be collected and combusted by one or more downstream soot filters. Filter regeneration is therefore more readily accomplished than in exhaust configurations that rely on a single high efficiency catalyzed soot filter.

The upstream filter is used in combination with one or more downstream filters. Another open cell foam or perforated metal foil filter can be used for the downstream filter, or another type of filter can be used. For example, the downstream filter can be a honeycomb wall flow filter; a wound or packed fiber filter, a sintered metal powder filter; a sintered metal fiber filter; perforated metal foil filter; or a ceramic fiber composite filter. Preferably, the porosity of the downstream filter is equal to or less than the upstream open cell foam filter. The efficiencies of each filter are selected to optimize the relative degree of particulate trapping in each of the filters, and to distribute the trapped particles between the filters so that the pressure drop is minimized while good trapping efficiency is maintained throughout the article.

Figure 2:
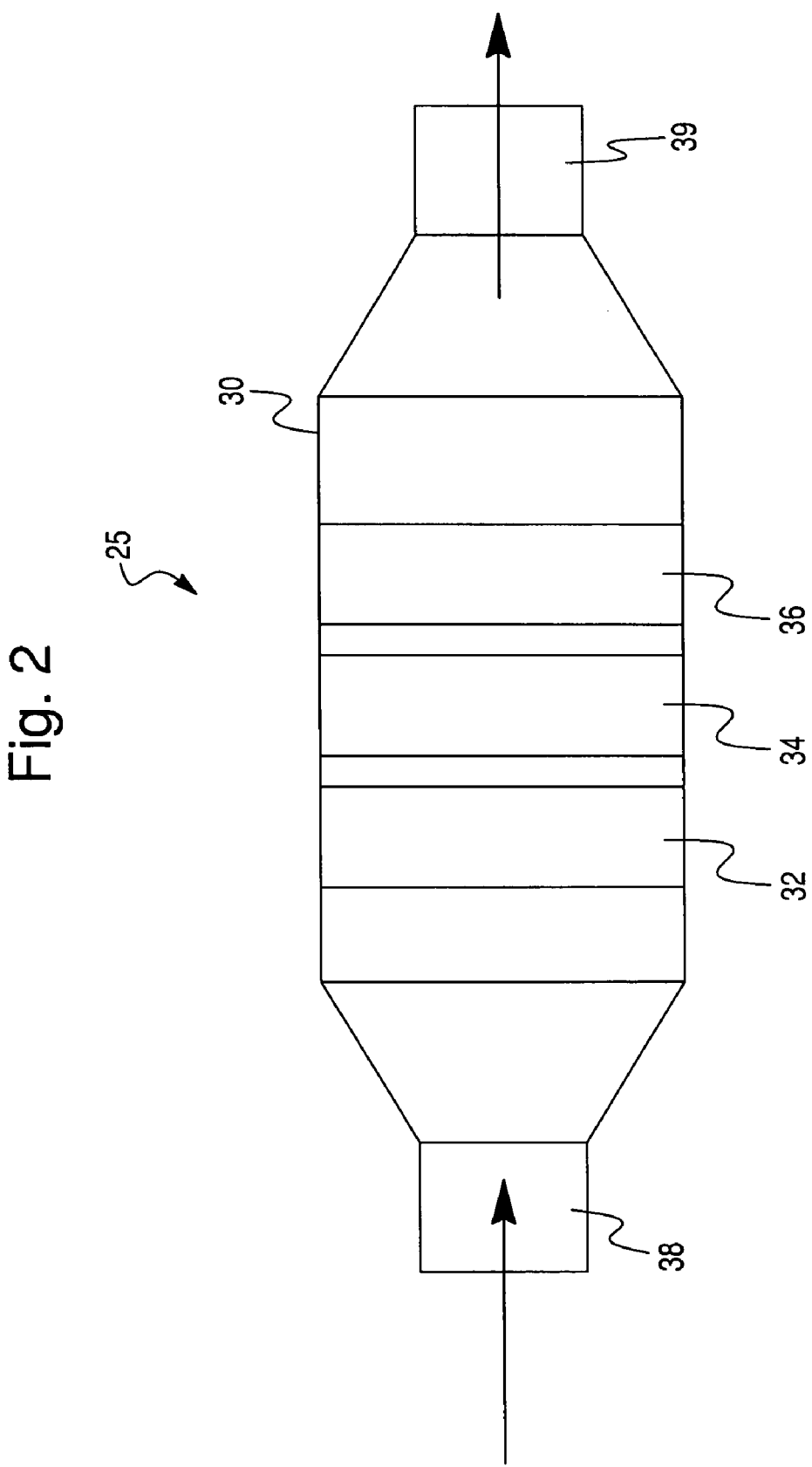
FIG. 2 depicts another embodiment of the article of invention containing a series of several open cell foam filters.

In some embodiments the exhaust article contains a series of several open cell foam filters of equal porosity and equal particulate filtration efficiency. For instance, as shown in FIG. 2, the article 25 can contain three to five catalyst-coated foam filters. FIG. 2, for example, shows a canister 30 housing three catalyst-coated, open cell foam filters 32, 34, and 36 that are serially arranged within the canister 30. The solid arrows indicate the direction of the exhaust flow within canister 30, which includes an inlet 38 and outlet 39. In some configurations of the article 25, all three foam filters are of low-efficiency (e.g., about 5 ppi). In other configurations, the upstream filter 32 is a low-efficiency filter, first downstream filter 34 is of medium efficiency (e.g., about 10 ppi) and the second downstream filter 36 is of high-efficiency (e.g., 20 ppi). As will be apparent to those of skill in the art, the filters need not be housed in the same canister, so long as separate canisters, if used, are in fluid communication with each other.

Figure 3:
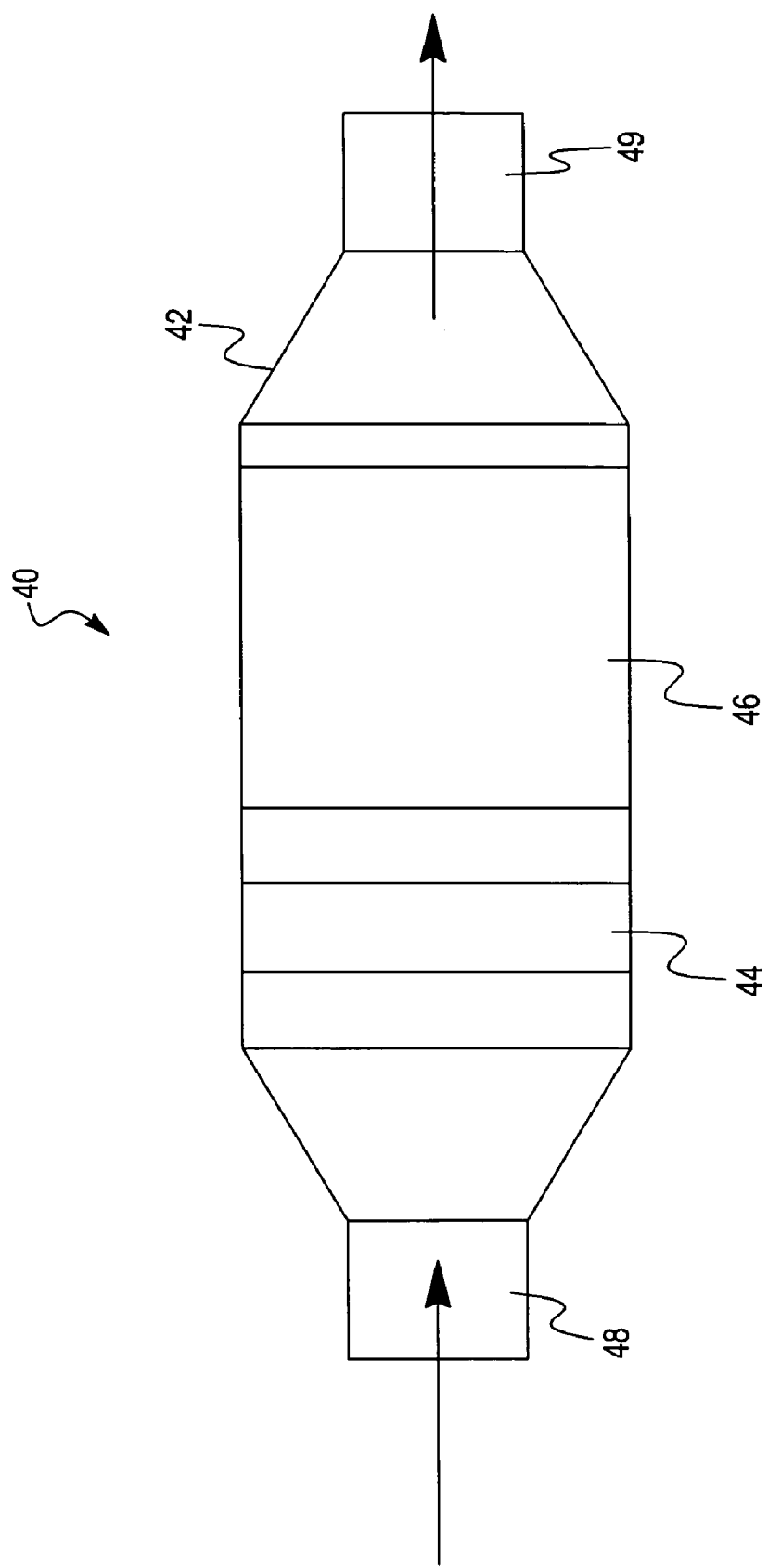
FIG. 3 depicts still another embodiment of the article of invention having a canister housing a catalyst-coated, upstream open cell foam filter and a downstream catalyst-coated, honeycomb-type wall flow filter.

In other embodiments, as shown in FIG. 3, the article 40 contains a canister 42 housing an upstream low-efficiency open cell foam filter 44 and a downstream filter 46 of higher particulate filtration efficiency. In a preferred embodiment, the downstream filter 46 is a catalyst-coated, honeycomb-type wall flow filter. Canister 42 contains an inlet 48 and outlet 49 for flow of exhaust gas therethrough. The solid arrows indicate the direction of the exhaust gas flow within canister 42.

Soot Filters

Soot filters that are useful in the invention include open cell foam filters, honeycomb wall flow filters; wound or packed fiber filters, sintered metal powder filters; sintered metal fiber filters; perforated metal foil filters; or ceramic fiber composite filters. Such soot filters are typically formed from refractory materials, such as ceramics or metals. In the practice of the present invention, the catalyzed filters are typically placed in a canister (also referred to as a housing), which directs the fluid stream to be treated through the canister inlet to the inlet side of the filter. Soot filters useful for the purposes of this invention include structures through which the exhaust stream passes without causing too great an increase of back pressure or pressure drop across the article.

Open cell foam filters can be formed on refractory metallic or ceramic materials that have sufficient thermal and mechanical stability for use in a diesel exhaust system. Such foam filters are known in the art, and depending on the manufacture thereof and the porosity of the foams, the filtration efficiency of the filters can be varied. Foam filters contain a plurality of interconnected voids that provide the exhaust stream with an irregular path as it flows from the inlet to the outlet of the filter. The greater amount of turbulence in the exhaust gas stream created by such irregularities in the foam filter, as compared to the turbulence in the exhaust stream in a wall flow filter, can lead to greater efficiencies in particulate collection in foam substrates.

The ceramic material used to form ceramic foam can be a refractory metal oxide, such as alumina, silica, magnesia, zirconia, titania, chromia, or combinations thereof such as cordierite or a refractory metal silicate or carbide. Examples of ceramic foams are disclosed in U.S. Pat. Nos. 4,264,347 and 6,077,060, which are hereby incorporated by reference.

In one embodiment, the preferred upstream filter is a metallic open cell foam filter. Materials used to form metallic foams include steel, stainless steel, aluminum, copper, nickel, zirconium and combinations thereof. For instance, a number of nickel-based foam filters are disclosed in U.S. Pat. No. 3,111,396, the disclosure of which is hereby incorporated by reference.

A preferred metallic open cell foam filter is one formed from an alloy of iron-chromium-aluminum-yttrium (FeCrAlY), such as are available from Porvair Fuel Cell Technology, Inc. (Hendersonville, N.C). Typically, FeCrAlY filters require either a pre-calcination step or application of thermal spray containing a binder material, such as nickel-aluminide, to improve the adherence of the catalyst washcoat onto the substrate.

Open cell foam filters suitable for use as an upstream filter in the exhaust treatment articles of this invention typically contain from 1 to 20 pores per inch (ppi), and more preferably from 1 to 10 ppi. Such pore densities provide the filters with the ability to capture only a portion of the particulate mass in the exhaust stream, thereby preventing clogging of the upstream filter. For foam filters having a pore density of 10-20 ppi, the filter has an 80-95% porosity (i.e., 5-15% theoretical density).

In another embodiment of the invention, the upstream filter comprises one or more sheets of a metal foil that typically has a thickness of about 5 to about 100 μm. Typically the foil is comprised of the same metals or metal alloys that have been used to prepare prior art metal foil substrates, e.g., titanium, stainless steel and alloys containing iron, nickel, chromium and/or aluminum. The metal foil may be utilized in one or more forms, e.g., it may be a flat, unstructured foil; it may be a structured foil, e.g., a foil containing corrugations, undulations, trapezoidal structures, ridges, etc., including corrugated foils wherein the corrugations are arranged in a serpentine or "zigzag" fashion; it may be a foil that has a plurality of openings, e.g., perforations; it may be a foil that has both corrugations and a plurality of openings; it may be a foil that has "tabs" that extend upwardly from the surface of the foil; it may be a foil that has a combination of features, e.g., corrugations, a plurality of openings and a plurality of such "tabs", and the like. In a preferred embodiment, the metal foil is a perforated metal foil, e.g., a PE-kat foil filter from Emitec Corp., Auburn Hills, Mich. A description of a metal foil filter is also provided in commonly assigned, co-pending U.S. patent application Ser. No. 10/926,157, filed on Aug. 25, 2004, which is incorporated herein by reference.

Figure 21:
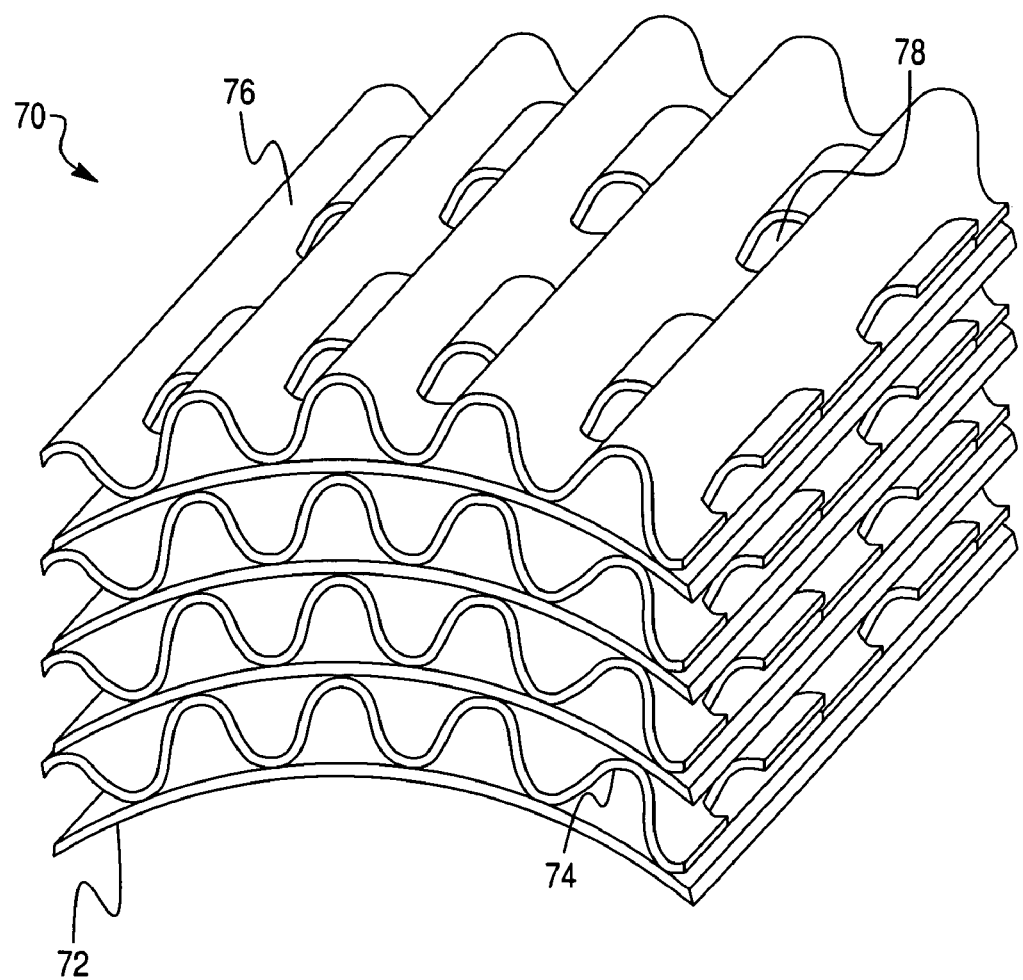
FIG. 21 is a plan view of a honeycomb body comprised of a perforated flat metal foil substrate in combination with a perforated and corrugated metal foil substrate having a plurality of "tabs" that extend upward above the surface of the substrate.

In the case of metal foil substrates having a plurality of openings, it should be understood that for the purposes of the present invention, such openings may be in the form of slits, perforations, holes having a generally polygonal shape, holes having a generally oval shape and/or holes having a generally circular shape or combinations of two or more of the foregoing types of openings. Preferably, the openings comprise holes having a generally oval or circular shape with diameters in the range of about 2 to about 10 mm, preferably 4-8 mm. Such openings will typically comprise from about 10 to about 80%, preferably 20 to 60%, of the area of the foil. This embodiment is shown in FIG. 21, which shows a view of a honeycomb body 70 containing a flat metal foil substrate 72, which may be perforated, in combination with a corrugated metal foil substrate 73 having a plurality of corrugations 74 and a plurality of tabs 76 that extend above the surface of the corrugated metal foil substrate. A plurality of perforations 78 may be contained in flat metal substrate 72 and corrugated metal foil substrate 73.

In one embodiment, the downstream filter is a honeycomb wall flow filter. The material used to form the wall flow filter should be relatively inert with respect to the catalytic composition dispersed thereon. Wall flow filters and the catalyst compositions deposited thereon are necessarily porous, as the exhaust must pass through the walls of the carrier in order to exit the carrier structure.

Wall flow filters have a plurality of fine, substantially parallel gas flow passages extending along the longitudinal axis of the filter body. Typically, each passage is blocked at one end of the body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes.

Figure 4:
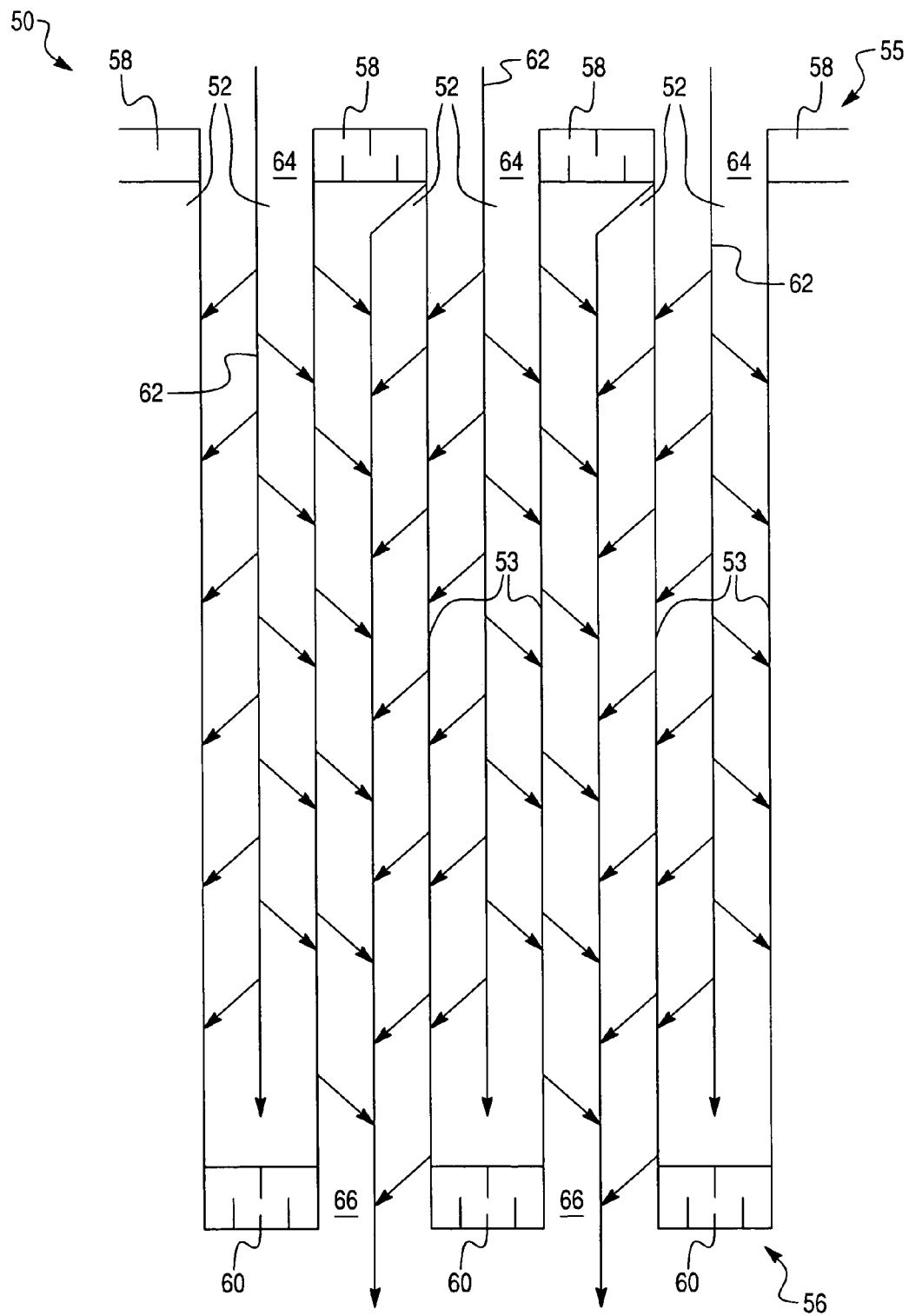
FIG. 4 depicts a longitudinal cross-sectional view of a wall flow filter and gas flow through the filter.

FIG. 4 illustrates a wall flow filter 50, which has a plurality of passages 52. The passages 52 are tubularly enclosed by the internal walls 54 of the filter 50. The filter 50 has an inlet end 55 and an outlet end 56. Alternate passages are plugged at the inlet end 55 with inlet plugs 58, and at the outlet end 56 with outlet plugs 60 to form opposing checkerboard patterns at the ends of the inlet 55 and outlet 56. A gas stream 62 enters through the unplugged channel inlet 64, and flows through passage 52. The gas flow is stopped by outlet plug 60 and diffuses through the internal walls 54 (which are porous) to the outlet side 66. The gas cannot pass back to the inlet side of walls because of inlet plugs 58.

Preferred wall flow filters are composed of ceramic-like materials such as cordierite, α-alumina, silicon carbide, silicon nitride, zirconia, mullite, spodumene, alumina-silica-magnesia, zirconium silicate, or of refractory metals such as stainless steel. Preferred wall flow filters are formed from cordierite and silicon carbide. Such materials are able to withstand the environment, particularly high temperatures, encountered in treating the exhaust gas streams.

Ceramic wall flow filters are typically formed of a material having a porosity of about 50 to 60%, and are typically used as the downstream filters in the exhaust gas treating articles of this invention. For instance, in some configurations, a cordierite wall flow filter having a porosity of 53% and a mean pore diameter of about 14 microns provides an adequate exhaust flow. Another configuration that provides less pressure drop is a wall flow filter with 60% porosity with a mean pore size of 26 microns.

In addition, both the cell density and the wall thickness affect the exhaust flow characteristics and the pressure drop that is observed in the exhaust system. Configurations that use wall flow filters with 100 cpsi and that have a 17 mil wall, and wall flow filter with 200 cpsi and a 12 mil wall both provide flow and pressure drops across the filter that are useful in the article of the invention.

The porous wall flow filter used in this invention is catalyzed, in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

Catalyst Compositions

The soot filters of the invention are coated with a catalyst composition effective for the combustion of particulate, and gaseous pollutants (e.g., unburned gaseous hydrocarbons, carbon monoxide). Such catalyst compositions generally contain a co-formed ceria-zirconia composite, a base metal oxide, and optionally contain one or more platinum group metal components. The co-formed ceria-zirconia composite and the base metal oxide can be formed into discrete layers that are deposited on the substrate (one overlying the other), or the ceria composite and base metal oxide can be used in admixture.

As used herein, the term "co-formed ceria-zirconia composite" refers to a bulk material that is a co-formed composite of ceria and zirconia, and optionally can contain other rare earth components selected from lanthanum, praseodymium and neodymium. The co-formed ceria-zirconia composites can be formed by techniques such as co-gelling, co-precipitation and the like. Any other suitable technique for preparing the ceria composite can be used provided that the resultant product contains the ceria and zirconia dispersed throughout the matrix of the particle in the finished product. Such techniques are distinguished from those that merely disperse zirconia on the surface of the ceria particles or only within a surface layer, thereby leaving a substantial core of the ceria particle without zirconia dispersed therein. Suitable techniques for forming co-precipitated ceria-zirconia composites are disclosed in U.S. Pat. Nos. 5,057,483 and 5,898,014, and the preparative descriptions disclosed therein are hereby incorporated by reference.

The cerium and zirconium salts that are useful for forming the co-formed ceria-zirconia composites are chlorides, sulfates, nitrates, acetates, etc. Where the composites are formed by a co-precipitation technique, the intermediate co-precipitates can, after washing, be spray dried or freeze dried to remove the water and then calcined in air at about 500° C. to form the co-formed ceria-zirconia composites. The co-formed ceria-zirconia composites have a surface area of at least 10 $m^2/g$ and preferably at least 20 $m^2/g$. In co-formed ceria-zirconia composites that contain only ceria and zirconia, the proportion of ceria in the co-formed ceria-zirconia composite is generally from 20 wt. % to 95 wt. %, and more preferably from 40 to 80 wt. %. The proportion of zirconia is typically from 10 wt. % to 60 wt. %, and preferably from 10 wt. % to 40 wt. % of the co-formed ceria-zirconia composite.

The catalyst compositions are useful in regenerating the soot filters that are used in diesel exhaust systems. The catalyst compositions are especially useful in regenerating soot filters in diesel exhaust systems during periods when the exhaust is cool, e.g., below 300° C. or typically below 200° C., such as when diesel engines are operated at low load, or at start up.

Co-formed ceria-zirconia composite can optionally contain additional rare earth metal elements selected from one or more of lanthanum, praseodymium and neodymium components. Rare earth metal oxides other than ceria generally form from 10 to 60 wt. % of the co-formed ceria-zirconia composite composition. A preferred co-formed ceria-zirconia composite contains praseodymia in addition to ceria and zirconia. Such a composite is particularly effective at lowering the temperatures at which the particulate, and in particular the soot fraction, combusts. The incorporation of these co-formed ceria-zirconia composites (containing praseodymia) is beneficial in regenerating soot filters containing deposited particulate (see Examples, below). While not being bound by theory, applicants believe that the praseodymia contributes to the enhanced catalytic effect of the co-formed composite due to the relative ease with which praseodymia transfers activated oxygen to the trapped carbonaceous component that comprises the soot fraction, over other rare earth metal oxides. For co-formed ceria-zirconia composites that contain praseodymium, there is generally from 30 to 95 wt. % ceria, from 5 to 40 wt. % zirconia, and from 10 to 60 wt. % praseodymia in the composite. Preferably, such co-formed composites contain from 40 to 80 wt. % ceria, from 5 to 25 wt. % zirconia and from 20 to 40 wt. % praseodymia.

As described above, preferred co-formed ceria-zirconia composites that contain praseodymia are preferably formed by techniques such as co-gelling and co-precipitation of soluble salts of mixtures of cerium, praseodymium and zirconium. It is preferred that all three components are mixed by the above-mentioned techniques so that all three components are dispersed uniformly throughout the composite matrix; however, it is also possible but less preferable to impregnate a co-formed ceria-zirconia composite with a solution of a soluble salt of praseodymium, e.g., praseodymium nitrate, to load the praseodymium component. Impregnation of a preformed ceria-zirconia composite is disclosed in U.S. Pat. No. 6,423,293, which is incorporated by reference herein.

The catalyst compositions used to coat the soot filters in the inventive articles may also contain a base metal oxide. While not being bound by theory, it is believed that the base metal oxides improve the adherence of the catalyst washcoat onto the filter substrates and provide binding action to the washcoat so that it is internally cohesive. The base metal oxide also provides an open washcoat morphology that improves gas phase diffusion. In some embodiments, the base metal oxides also serve as a catalyst support for platinum group metal components.

Preferred base metal oxides are one or more of alumina, zirconia, silica, titania, silica-alumina, magnesium oxide, hafnium oxide, lanthanum oxide and yttrium oxide. The base metal oxides are typically used in bulk form and generally have a surface area of at least 10 $m^2/g$, and preferably have a surface area of at least 20 $m^2/g$. A preferred base metal oxide is alumina, which is preferably gamma alumina. For example, gamma alumina can have a surface area of 120 to 180 $m^2/g$ when it is used as the base metal oxide component.

The base metal oxides are generally used in an amount from 10 to 90 wt. % of the catalyst composition. Preferably the base metal oxides are incorporated into the catalyst compositions at concentrations of from 20 to 80 wt. %. More preferably, the catalyst compositions contain a concentration of base metal oxides of from 40 to 60 wt. %. For example, a catalyst composition deposited on a soot filter can contain 50 wt. % of base metal oxide in combination with 50 wt. % of co-formed ceria-zirconia composite.

In some embodiments, it may be preferable to include a washcoat binder such as hydrated forms of alumina, e.g., pseudoboehmite, to improve the adherence of the catalyst composition on the filter substrate. Other binders that are useful in the invention include binders formed from silica, silica-alumina and zirconia. For purposes of this application, such binders are considered to be part of the base metal oxide component of the catalyst washcoat.

In some embodiments, it may be preferable to include a platinum group metal component in the catalyst composition. Useful platinum group metal components are selected from platinum, palladium and rhodium components. The inclusion of the platinum group metal is useful for catalyzing the combustion of gaseous components such as unburned hydrocarbons and carbon monoxide to innocuous emissions. In addition, the inclusion of platinum group metals is also useful for generating nitrous oxide ($NO_2$) from nitric oxide (NO) to assist in the combustion of the particulate. $NO_2$ is known as a powerful oxidant that is particularly useful for catalyzing the particulate deposited on the soot filter at lower exhaust temperatures than would be possible with other oxidants such as molecular oxygen.

The platinum group metal components can be dispersed in the catalyst compositions by deposition on particles of the co-formed ceria-zirconia composite, on particles of the base metal oxide, or on both using solutions of water-soluble salts or complexes of platinum group metals (also referred to as "platinum group metal precursors"). Typically, an impregnation procedure is used to achieve the dispersion of the platinum group metal components onto the particles of the ceria composite and/or the base metal oxide component. For example, potassium platinum chloride, ammonium platinum thiocyanate, amine-solubilized platinum hydroxide, chloroplatinic acid, palladium nitrate and palladium chloride are platinum group metal precursors that can be used to achieve the impregnation of the particles of the co-formed ceria-zirconia composite and/or the base metal oxide component. Upon calcination of the catalyst compositions, the platinum group metal precursors are converted to the catalytically active metal or its oxide. The impregnation of the platinum group metal components on the co-formed ceria-zirconia composite and/or base metal oxide can be conducted after coating the catalyst composition on the substrate; however, the impregnation is preferably conducted prior to coating the catalyst composition.

In embodiments where platinum group metals are incorporated into the catalyst composition, there is generally from 0.1 to 200 g/ft$^3$ of the platinum group metal in the final calcined filter substrate. Since the exhaust articles of the invention can be used without the requirement of incorporating an upstream diesel oxidation catalyst that is incorporated on a flow-through substrate, sufficient concentrations of platinum group metal components are preferably deposited on the filter substrates to convert the gaseous components of the exhaust (gaseous unburned hydrocarbons and carbon monoxide) to innocuous products. In addition, as described above, it is desirable to produce sufficient $NO_2$ from NO in the exhaust to lower the combustion temperature of the particulate, particularly the soot fraction. Preferably there is from 10 to 100 g/ft$^3$, and more preferably 20 to 80 g/ft$^3$ of platinum group metal in the catalyst composition. Preferably, the platinum group metal is platinum.

Lower concentrations of platinum group metals (e.g., 0.1 to 10 g/ft$^3$) can be used in instances where it is desirable to minimize the formation of sulfate components in the particulate. For instance with diesel fuels that contain higher sulfur levels (not ultra low diesel fuel), it is desirable to minimize the oxidation of sulfur to $SO_3$ so as to reduce the formation of sulfuric acid.

The upstream catalyst compositions deposited on an open cell foam substrate are generally deposited at a concentration of from about 0.10 g/in$^3$ to about 5.14 g/in$^3$. Depending on the type of soot filter used, downstream catalyst compositions can be deposited at concentrations of from 0.1 g/in$^3$ to 2.64 g/in$^3$. For example, where the downstream filter is a wall flow filter substrate, the catalyst composition is preferably deposited at from 0.25 g/in$^3$ to 0.60 g/in$^3$, or from 0.45 g/in$^3$ to 0.60 g/in$^3$.

Coating of Foam Filters

The following is a general method of preparation of the catalyst compositions that can be applied to embodiments of the upstream and downstream catalyst filters. The co-formed ceria-zirconia composite materials and the base metal oxides (e.g., gamma alumina) of the present invention can be prepared in the form of an aqueous slurry of co-formed ceria-zirconia composite particles and base metal oxide particles, the particles optionally being impregnated with a platinum group metal component. Typically, the co-formed ceria-zirconia and base metal oxide particles are mixed with water and an acidifier such as acetic acid, nitric acid or sulfuric acid, and ball milled to a desired particle size. The slurry is then applied to the filter substrate, dried and calcined to form a catalytic material coating ("washcoat") thereon.

The optional catalytic metal component, e.g., platinum, when used, is preferably dispersed on the co-formed ceria-zirconia composite particles, on the base metal oxide particles, or on both the composite and base metal oxide particles. Such incorporation may be carried out after the slurry containing the co-formed ceria-zirconia composite particles and the base metal oxide particles is coated as a washcoat onto a suitable filter substrate. This may be done by impregnating the coated substrate with a solution of a compound of a platinum group metal precursor, followed by drying and calcination. However, preferably, the ceria-zirconia composite particles, the base metal oxide particles, or both are impregnated with the platinum group metal precursor before a coating of the slurry is applied to the carrier. In either case, the optional platinum group metal may be added to the co-formed ceria-zirconia base metal oxide catalytic material as a solution of the platinum group metal precursor, with the solution serving to impregnate the co-formed ceria-zirconia composite and base metal oxide particles. The platinum group metal precursor is then treated to fix the platinum group metal on the particles either chemically or by calcination. For example, when an amine-solubilized platinum hydroxide is used as the platinum precursor, the pH of the slurry is lowered typically by adding an acid (e.g., acetic acid) which decomposes the amine-platinum complex and fixes the platinum components to the co-formed ceria-zirconia and/or base metal oxide particles as a low solubility platinum hydroxide. The particles can then be dried and calcined.

Generally, the slurry of co-formed ceria-zirconia composite and base metal oxide particles, whether or not impregnated with a platinum group metal precursor solution, will be deposited upon the filter substrate, and then dried and calcined to adhere the catalytic material to the substrate and, when a platinum group metal component is present, to revert the platinum group metal component to the elemental metal or its oxide. Suitable platinum group metal precursors for use in the foregoing process include potassium platinum chloride, ammonium platinum thiocyanate, amine-solubilized platinum hydroxide, chloroplatinic acid, palladium nitrate, and palladium chloride, as is well known in the art.

In an alternate catalyst composition design, separate discrete layers of bulk co-formed ceria-zirconia composite, bulk base metal oxide and, optionally, bulk activated alumina are employed. These discrete layers are applied as separate coats superimposed one above the other on the carrier. The order of application of such discrete layers is not important, and each layer (of co-formed ceria-zirconia composite, and base metal oxide) may comprise either the first-applied or inner coat or layer, the last-applied or outer coat or layer or, if a third layer is present, the intermediate coat or layer. A layer of a given material may be repeated two or more times. When a platinum group metal is present, it may be dispersed in any one or more of the discrete coats or layers.

When coating open cell foam filters of the present invention with catalyst compositions, it is preferable in some embodiments to pre-treat the foam substrates in order to improve the adherence of the composition on the substrate. For instance in using FeCrAlY open cell foam substrates, the substrates are preferably subjected to a calcination step prior to deposition of the catalyst slurry. Where thicker washcoats of catalyst composition need be deposited, the foam substrates can be thermally sprayed with a chemical composition to deposit a metal anchor layer onto the substrate. The deposition can be conducted by electric arc spraying a metal feedstock, selected from the group consisting of nickel, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/, Fe/Ni/Al, Fe/Ni/Cr, 300 series stainless steels, 400 series stainless steels, and mixtures of two or more thereof. For purposes of the present application, metal anchor layers are not considered as part of the catalyst composition. Methods of depositing metal anchor layers are disclosed in WO 99/56853, which is herein incorporated by reference.

Without deposition of an anchor layer, the washcoat compositions are preferably deposited on metallic open cell foam substrates at a concentration of up to about 6.0 g/in$^3$. Where an anchor layer is deposited on metallic open cell foam filters, higher concentrations of washcoats can be deposited such as up to about 10 g/in$^3$. Ceramic open cell foam filters can generally accommodate up to 15 g/in$^3$.

Coating of Metal Foil Filters

In a preferred embodiment, the coating process involves the following steps: (a) immersing the filter substrate to at least about 30%, preferably at least 50%, of its length into a vessel containing a slurry of the desired catalyst composition; (b) centrifuging the filter substrate resulting from step (a) so as to thereby distribute the coating catalyst composition as a substantially uniform layer on the filter substrate and remove any coating catalyst composition in excess of that desired to be present on the filter substrate; (c) drying the coated filter substrate resulting from step (c); and (d) calcining the dried coated filter substrate resulting from step (c).

Typically, step (c) will be conducted at a temperature of about 70 to about 180° C., preferably 80 to 120° C., for about 1 to about 60 minutes, preferably 15 to 30 minutes. Step (d) will typically be conducted at a temperature of about 400 to about 700° C., preferably 450 to 550° C., for about 20 minutes to about 5 hours, preferably 30 minutes to 3 hours.

If desired, two or more different coating catalyst composition may be substantially uniformly coated on the filter substrate by the following variation in step (a): the substrate is immersed to about 30% to about 70% of its length in a first slurry of a coating catalyst composition and the filter substrate is thereafter again immersed such that the remaining length is immersed in one or more other slurries of other coating catalyst compositions.

The coating process of this invention has been used to substantially uniformly coat filter substrates having diameters of about 2 to about 6 inches in diameter and about 1.7 inches to about 4 inches in length.

The coating process of this invention lends itself to as many substantially uniform coating layers on the filter substrate as desired. Steps (a) and (b) may be repeated as many times as desired with the same or different coating material slurries as desired. Preferably, the coated filter substrate is dried after each such coating operation and most preferably, the coated filter substrate is both dried and calcined after each coating operation.

Coating of Wall Flow Filters

The catalyst compositions can be applied to wall flow substrates by any means that achieves a uniform coating of the substrate. For example, an aqueous slurry containing the catalyst composition of the present invention can be applied by spray coating, brushing, or by dipping a surface into the slurry. Typically, after the catalyst slurry has been applied, air is blown through the wall flow substrate to prevent the slurry from blocking the porous walls. Although the catalyst slurries can be dispersed on the wall flow substrates in discrete layers, it is preferable to uniformly disperse the catalyst composition throughout the porous walls surrounding the passages of the substrate.

The following examples are for the purpose of illustrating the present invention, and are not to be construed as limiting the invention to only the scope disclosed therein.

EXAMPLES

Model Particulate Material Combustion Tests and Test Results

Various catalyst powders were evaluated for their ability to oxidize (burn) a model particulate material. This evaluation was conducted under oxidizing conditions (i.e., atmosphere) using Thermogravimetric Analysis (TGA) and Differential Thermal Analysis (DTA). TGA can measure the weight loss of materials as a function of temperature, and DTA can measure the heat evolution (exotherm) or heat absorption of a material as a function of temperature. In this way the oxidation of diesel particulate material can be measured, and the oxidation performances of different catalyst compositions can be compared.

Model particulate materials were used to simulate the VOF and soot fraction of the diesel particulate, and were of two types. One of the model diesel particulate materials comprised a mixture of 70 wt. % of commercially available carbon black powder (Thermax Powder N-991 from Cancarb of Medicine Hat, Alberta, Canada) to simulate the carbonaceous soot fraction, and 30 wt. % lube oil (Cummins SAE-15W Premium Blue Diesel Engine Lube Oil) to simulate the VOF in the diesel engine exhaust. This material was designated as model particulate material P1. Lube oil is incorporated into the model particulate matter materials due to the fact that in many diesel engines the VOF in the diesel exhaust consists mainly of diesel lube oil which has been swept from the cylinder walls and comes through valve guides and turbocharger seals.

A second model particulate material (designated as model particulate material P2) comprised 70 wt. % of real soot collected from a heavy-duty diesel engine that was mixed with 30 wt. % of the same lube oil that was used in model particulate material P1. The soot fraction used in model particulate material P2 was collected from a model year '98 7.2 L, 300 HP engine running at 1800 RPM and 10% load. The exhaust temperature under this condition was 195° C. For this soot collection, the engine was running on Phillips μLS fuel (3 ppm wt. S).

The laboratory testing was conducted using a Rheometrics (Polymer Labs) STA 1500 Simultaneous TGA/DTA unit equipped with provisions for introducing an oxidizing gas for exposure to the sample. Three oxidizing gases were used in the evaluations described below to simulate the lean conditions and gaseous compositions encountered in the diesel exhaust. The oxidizing gases were either:

1. flowing air (20% $O_2$)
2. a mixture of helium and air (10% $O_2$)
3. a mixture of $NO_2$ in helium in air (5000 ppm $NO_2$ and 10% $O_2$)

The catalyst test powders evaluated were:
1. Cerium oxide powder ($CeO_2$, 100 wt. %), which was designated as test catalyst powder A.
2. Co-formed ceria-zirconia composite powder (70 wt. % $CeO_2$-30 wt. % $ZrO_2$), which was designated as test catalyst powder B.
3. Co-formed ceria-zirconia-composite containing lanthanum oxide (55 wt. % $CeO_2$-15 wt. % $ZrO_2$-35 wt. % $La_2O_3$), designated as catalyst powder C.
4. Co-formed ceria-zirconia composite powder containing praseodymia (55 wt. % $CeO_2$-15 wt. % $ZrO_2$-35 wt. % $Pr_6O_{11}$), designated as catalyst powder D.
5. A catalyst composition that contained 4 parts of 6 wt. % platinum on gamma alumina (having a surface area of 150 $m^2/g$) and 1 part of co-formed ceria-zirconia composite powder (70 wt. % $CeO_2$-30 wt. % $ZrO_2$), designated as catalyst powder E.
6. Finely ground cordierite wall flow filter substrate material (Corning Ex-80) as a control, designated as control powder A.

Each of the candidate catalyst powders or control powder was mixed thoroughly with a model diesel particulate material to give uniform test sample mixtures containing 20 wt. % model particulate mixture, and 80 wt. % of catalyst powder (or control powder). A small portion (30 mg) of the test sample mixture was then placed in the sample pan of the TGA/DTA unit, and the sample was heated at a rate of 10° C./min under a flow of the oxidizing gas. The TGA and DTA responses were measured as a function of temperature.

Figure 5:
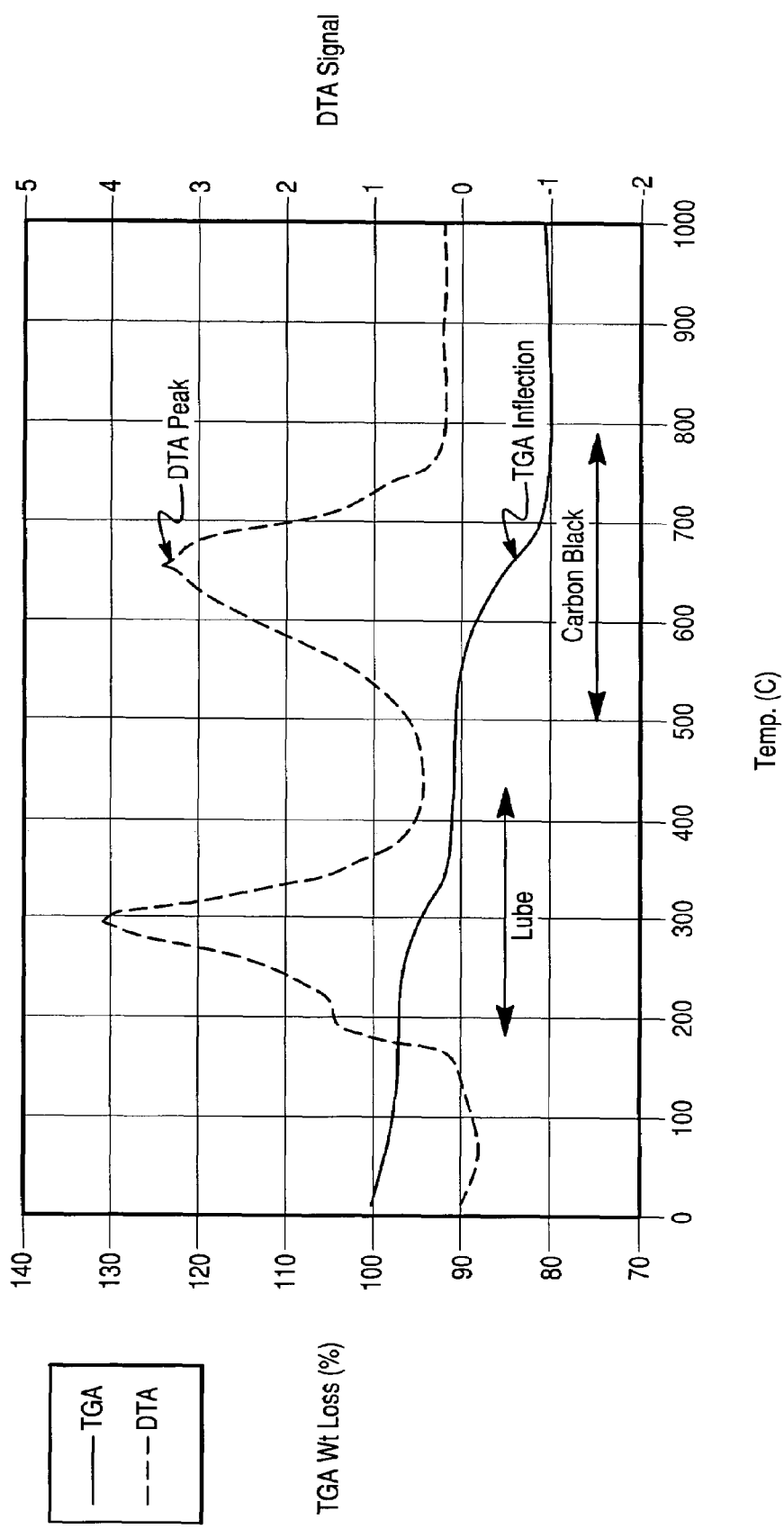
FIG. 5 depicts the TGA (Thermogravimetric)-DTA (Differential Thermal Analysis) results of a catalyst test powder mixed with a model SOF (Lube Oil) and model soot (Carbon Black) as a function of temperature in air.
Figure 6:
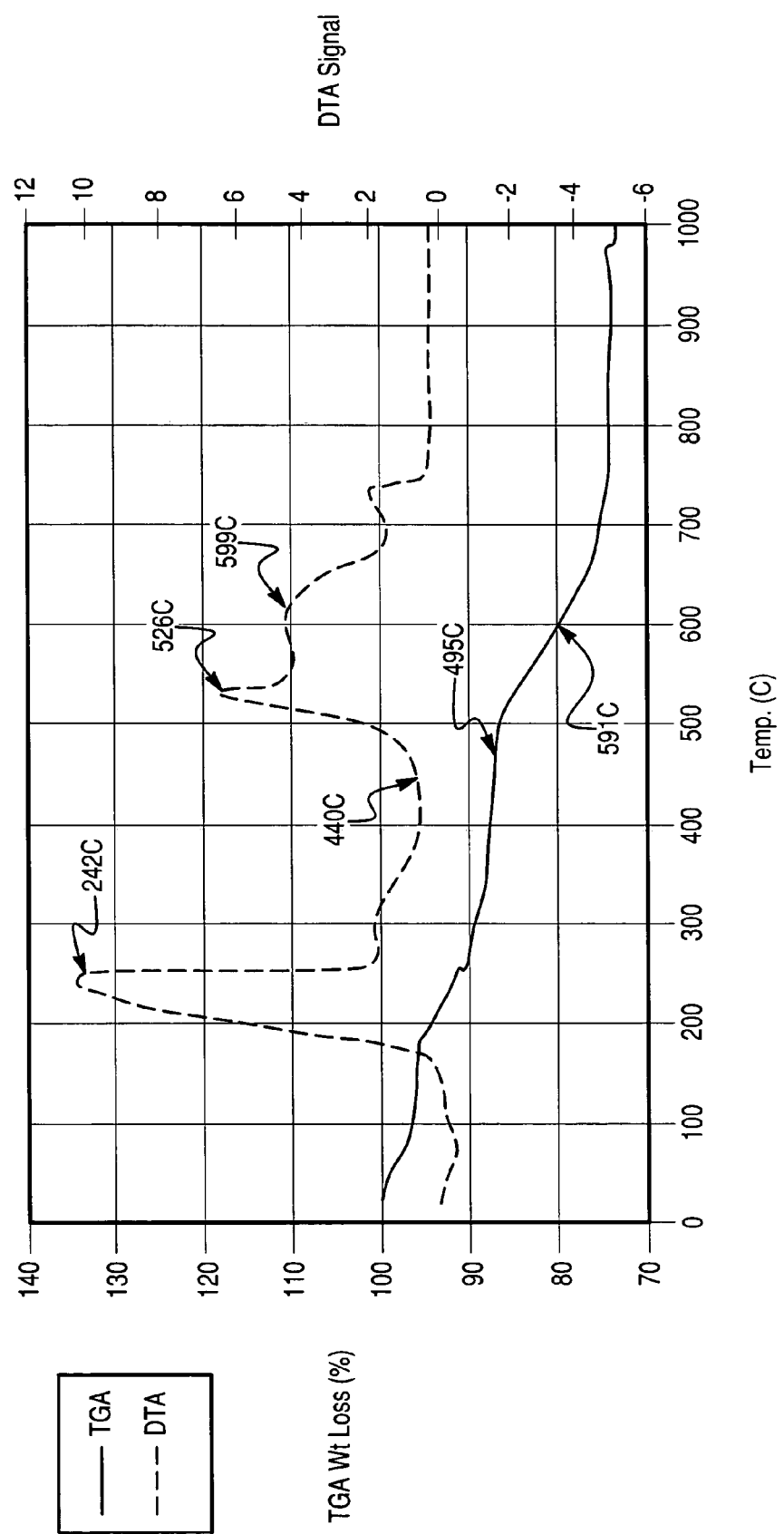
FIGS. 6-10 depict the TGA-DTA results of specific catalyst powders mixed with a model SOF and model soot as a function of temperature in air.
Figure 7:
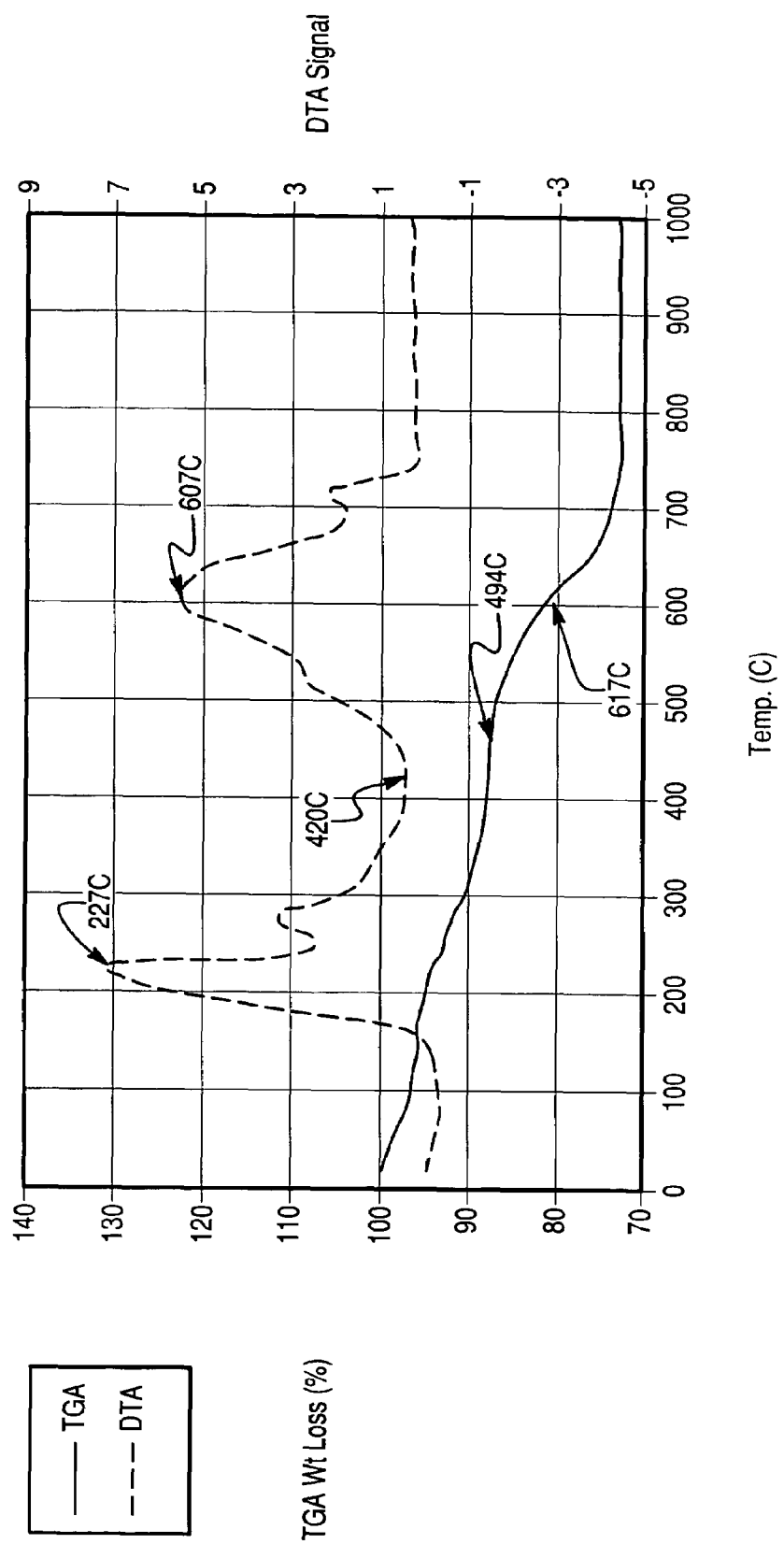
Figure 8:
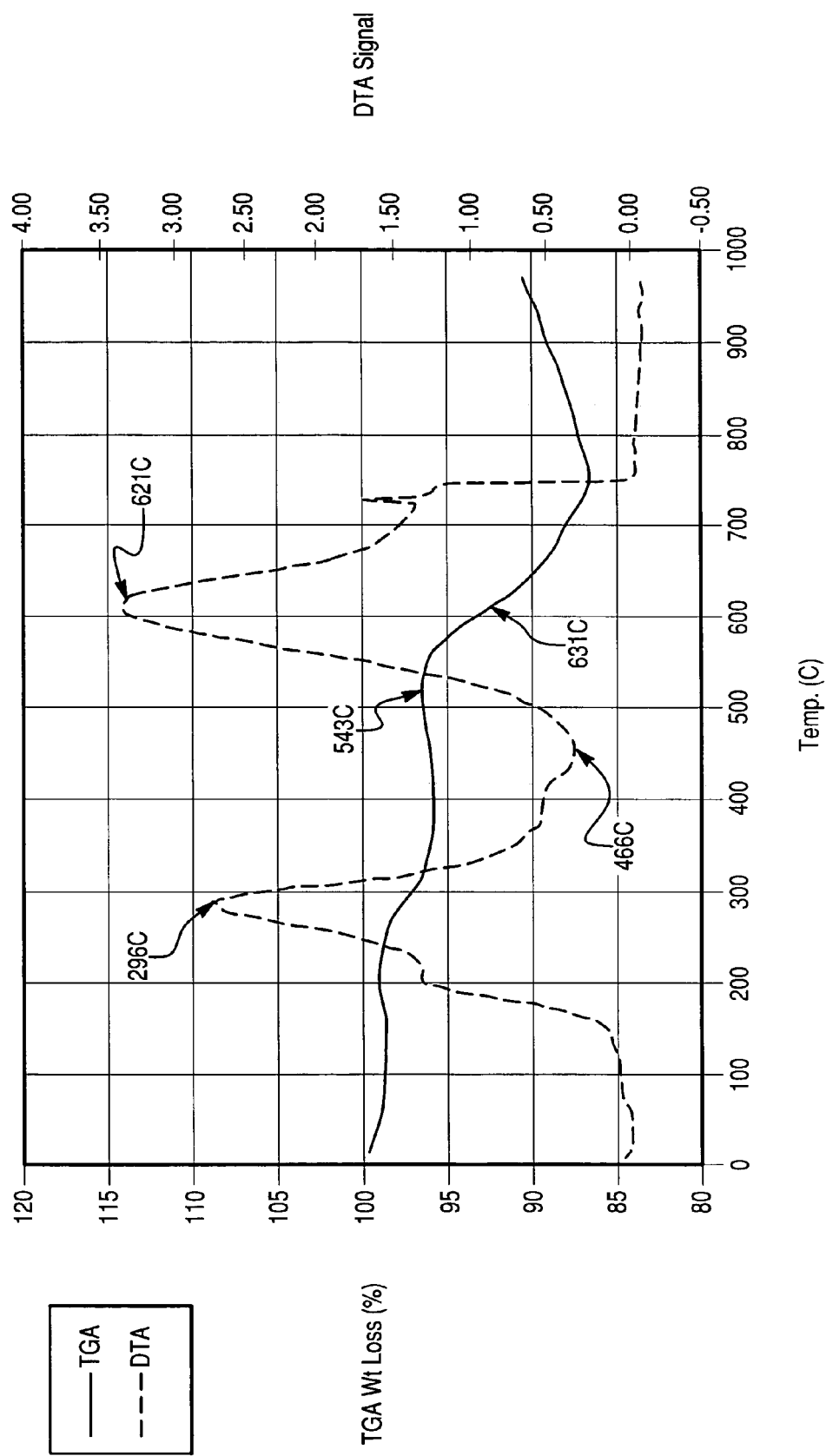
Figure 9:
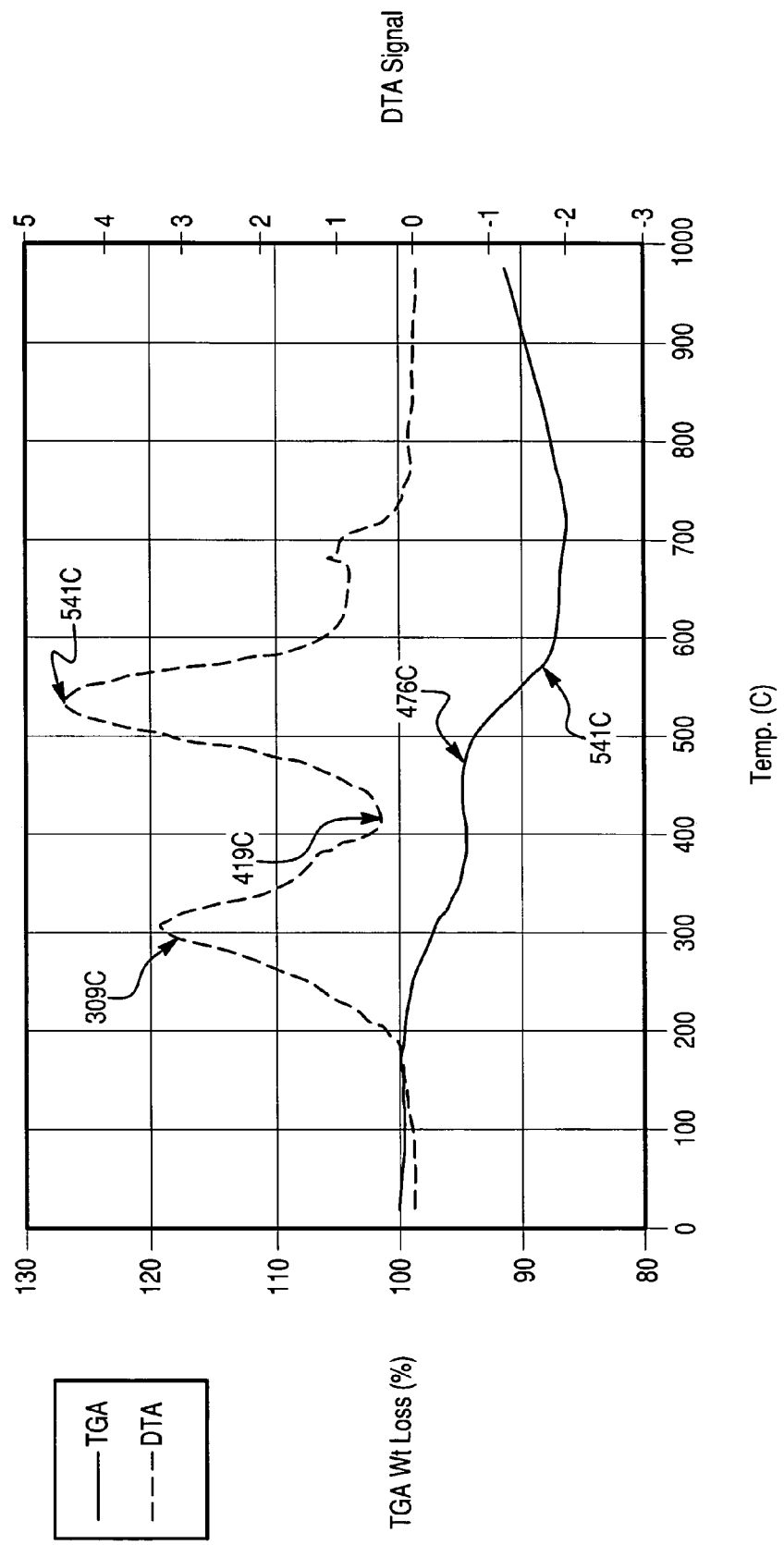
Figure 10:
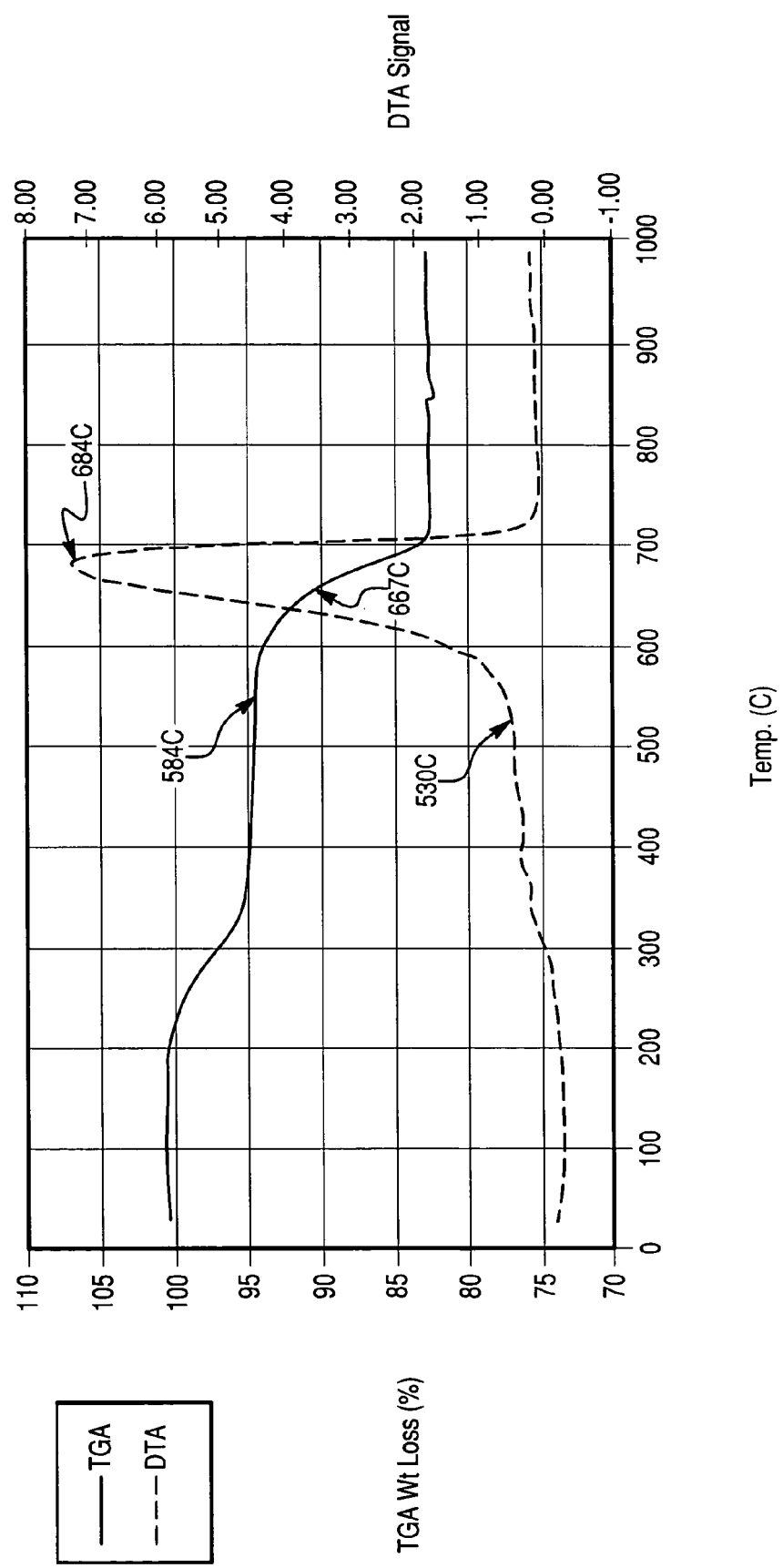
Figure 11:
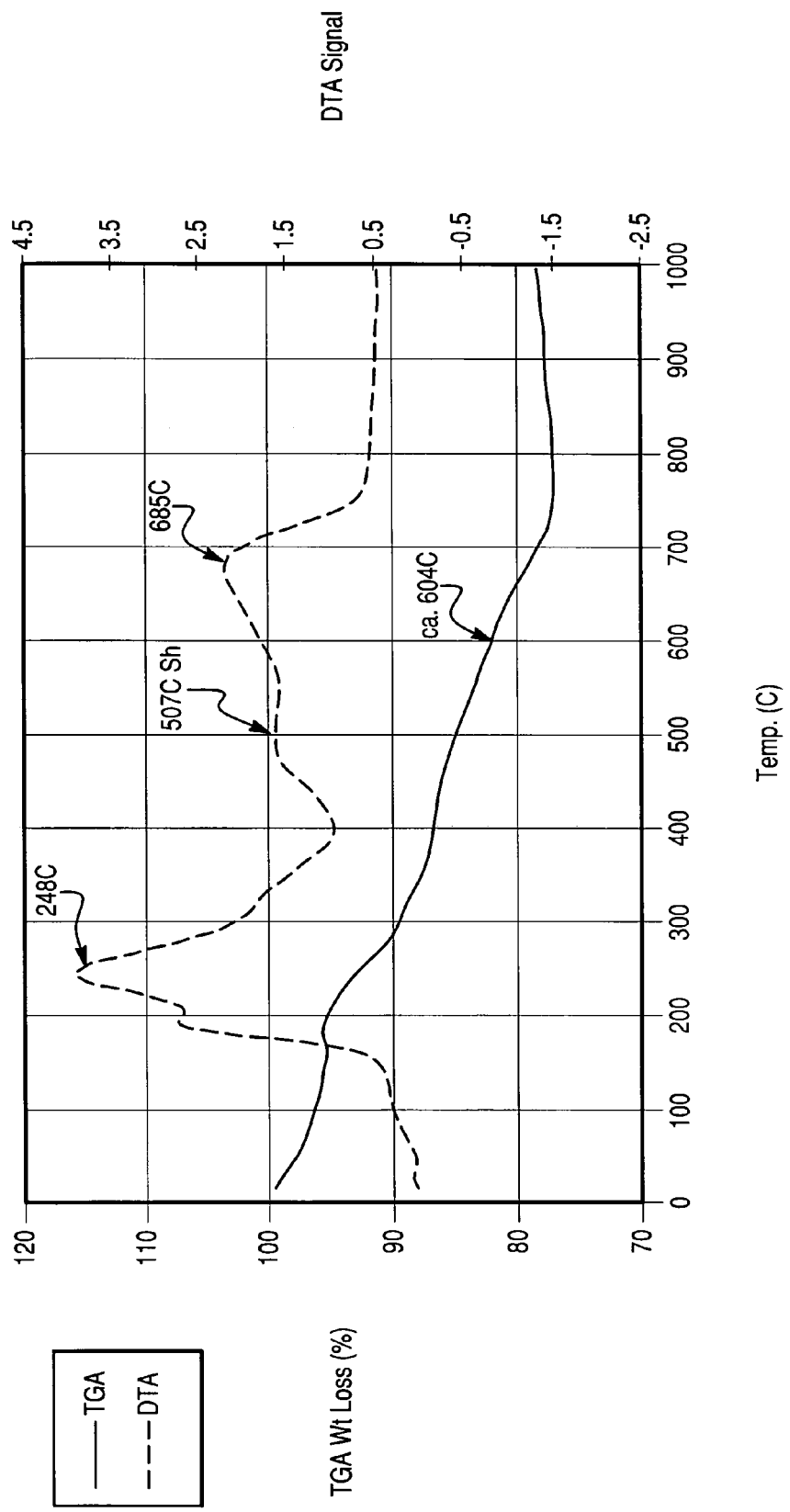
FIGS. 11-15 depict the TGA-DTA results of specific catalyst powders mixed with a model SOF and soot derived from a diesel engine as a function of temperature in helium/air as the oxidizing gas.
Figure 12:
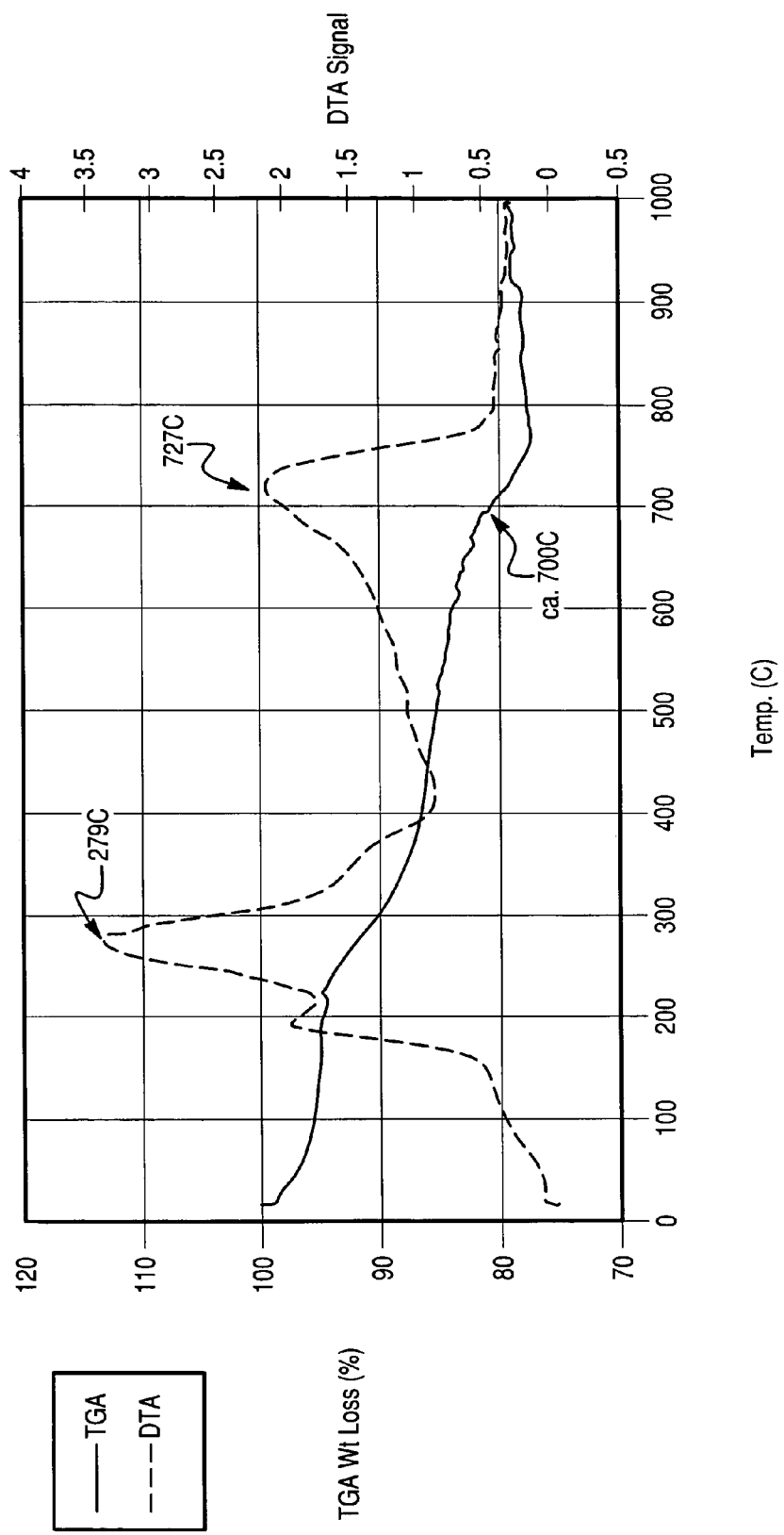
Figure 13:
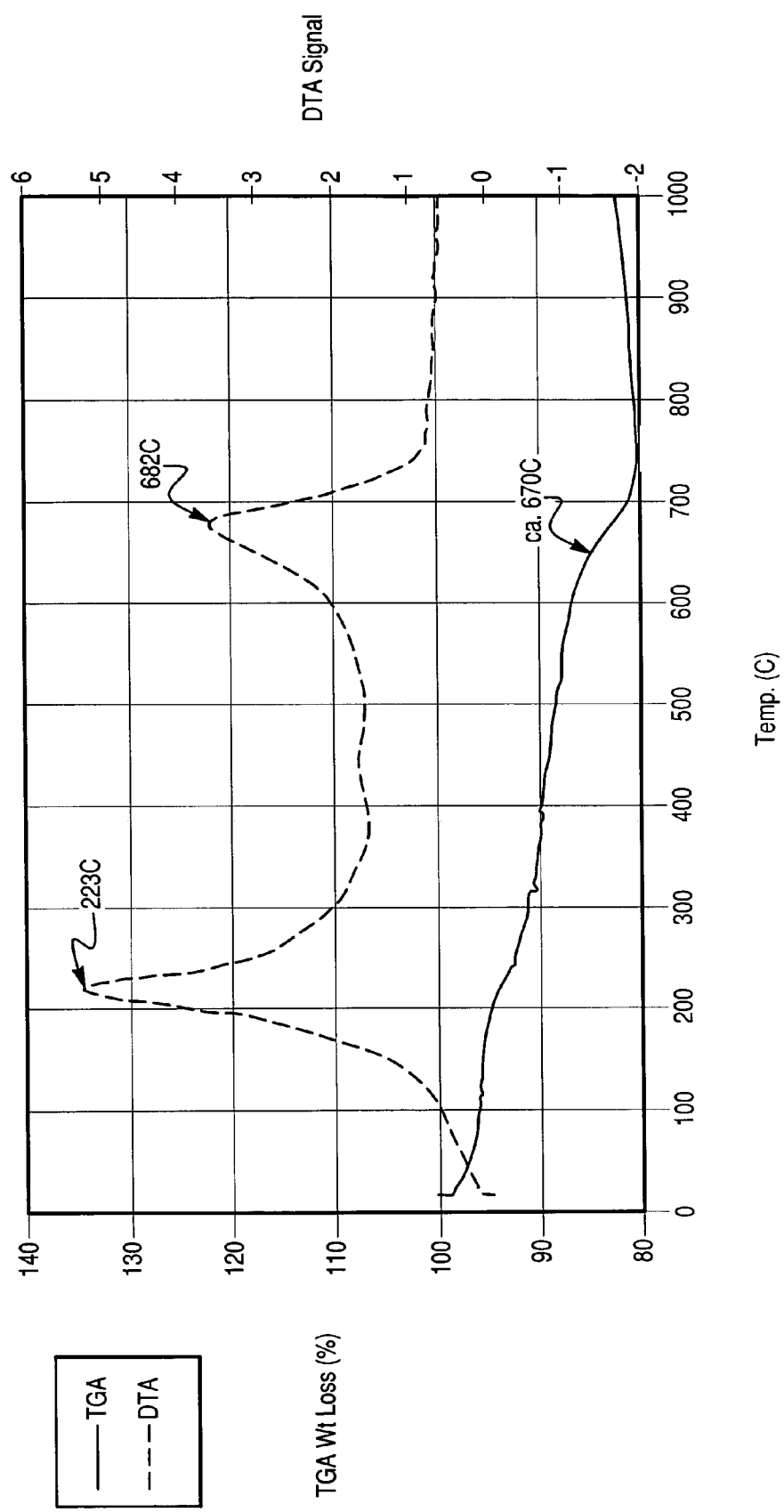
Figure 14:
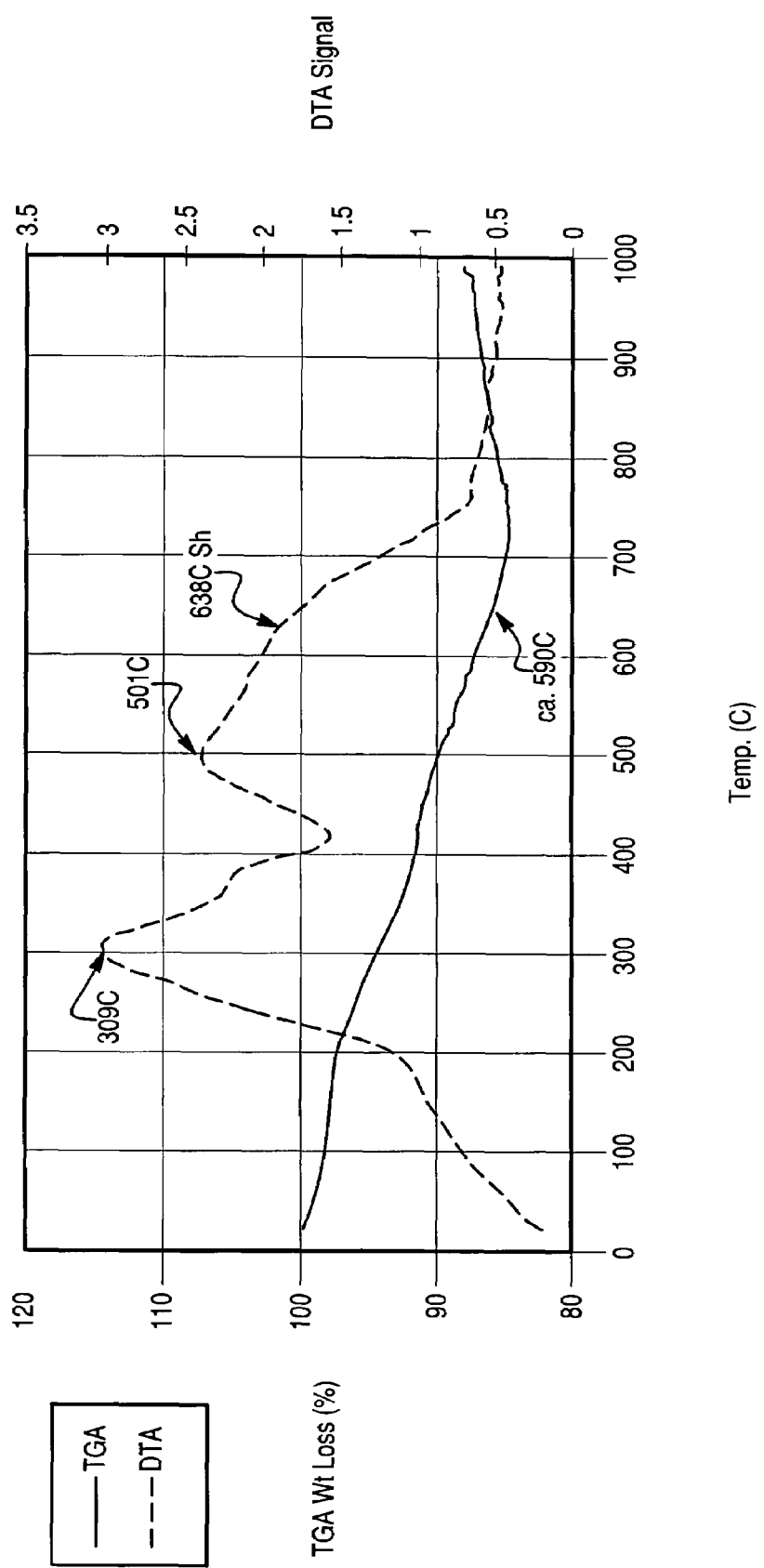
Figure 15:
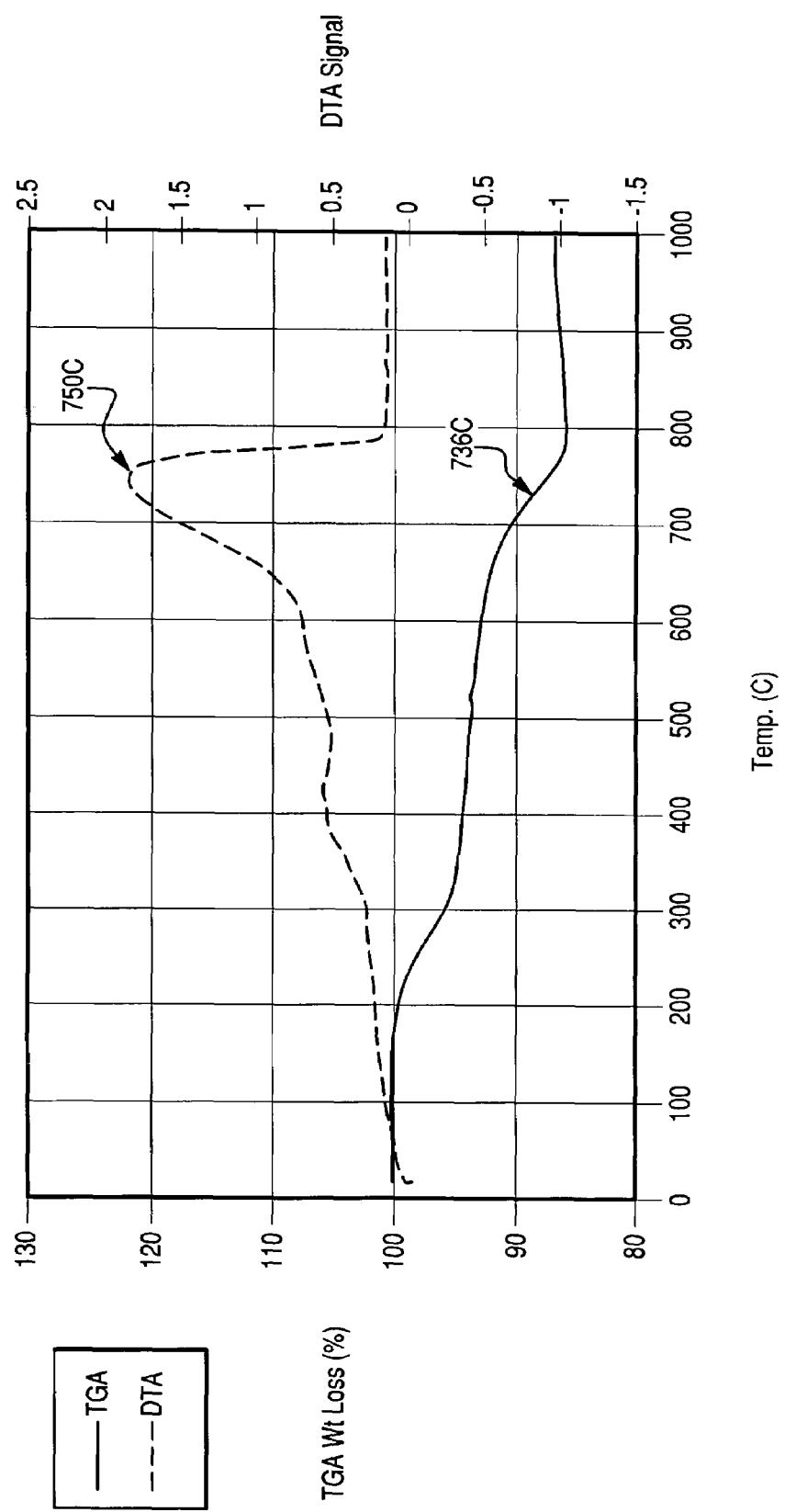
Figure 16:
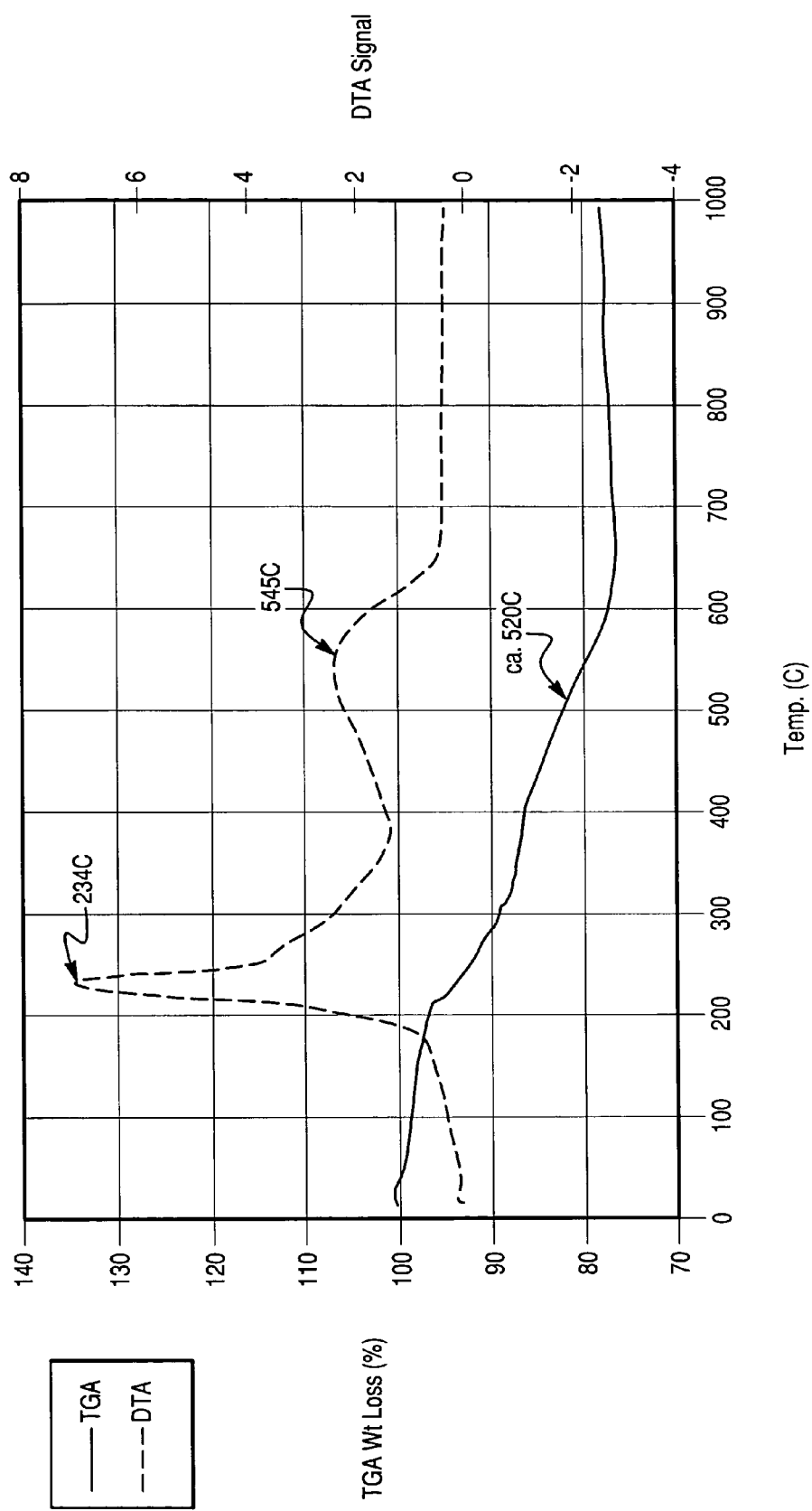
FIGS. 16-20 depict the TGA-DTA results of specific catalyst powders mixed with a model SOF and soot derived from a diesel engine as a function of temperature in helium-$NO_2$/air as the oxidizing gas.
Figure 17:
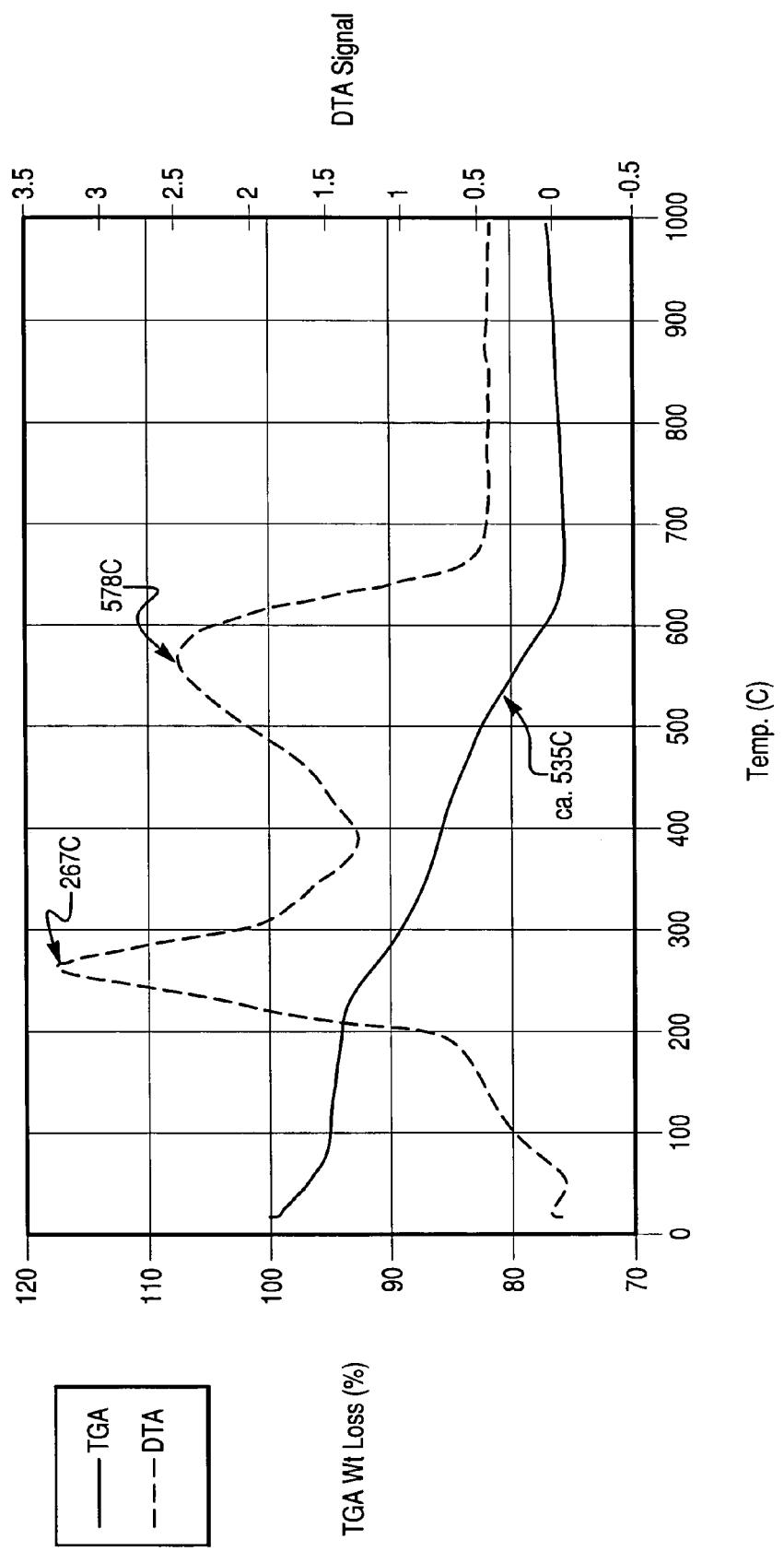
Figure 18:
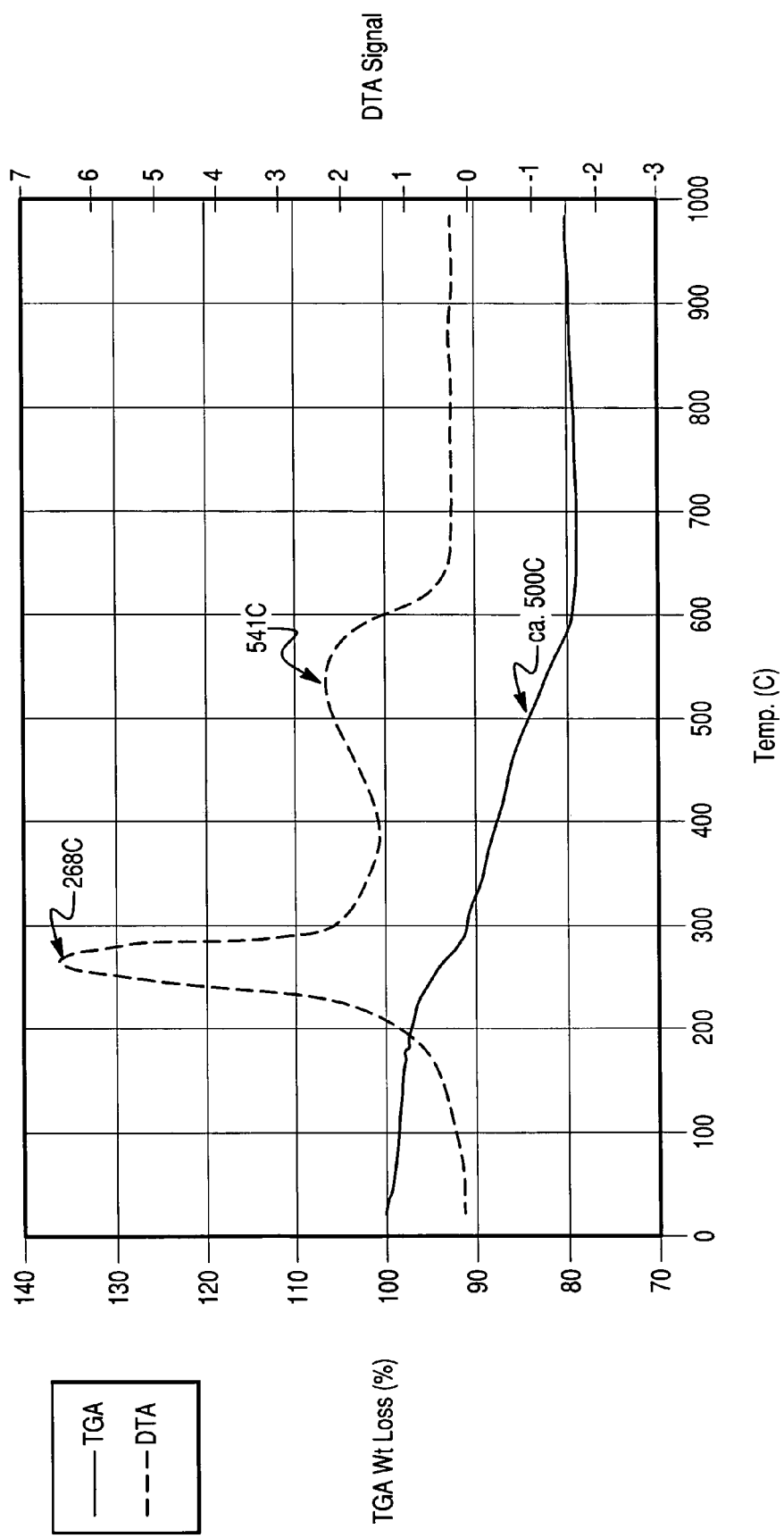
Figure 19:
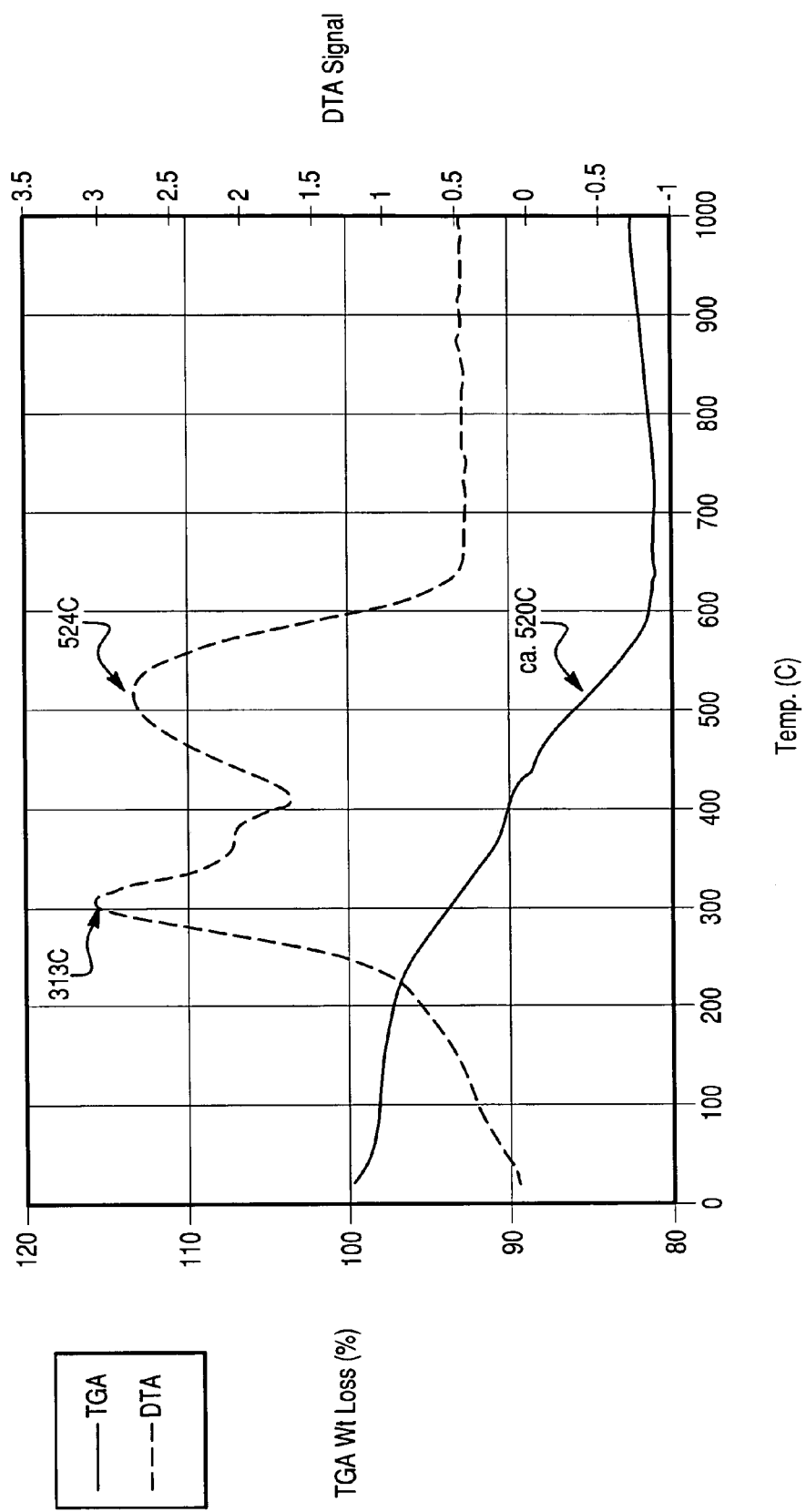
Figure 20:
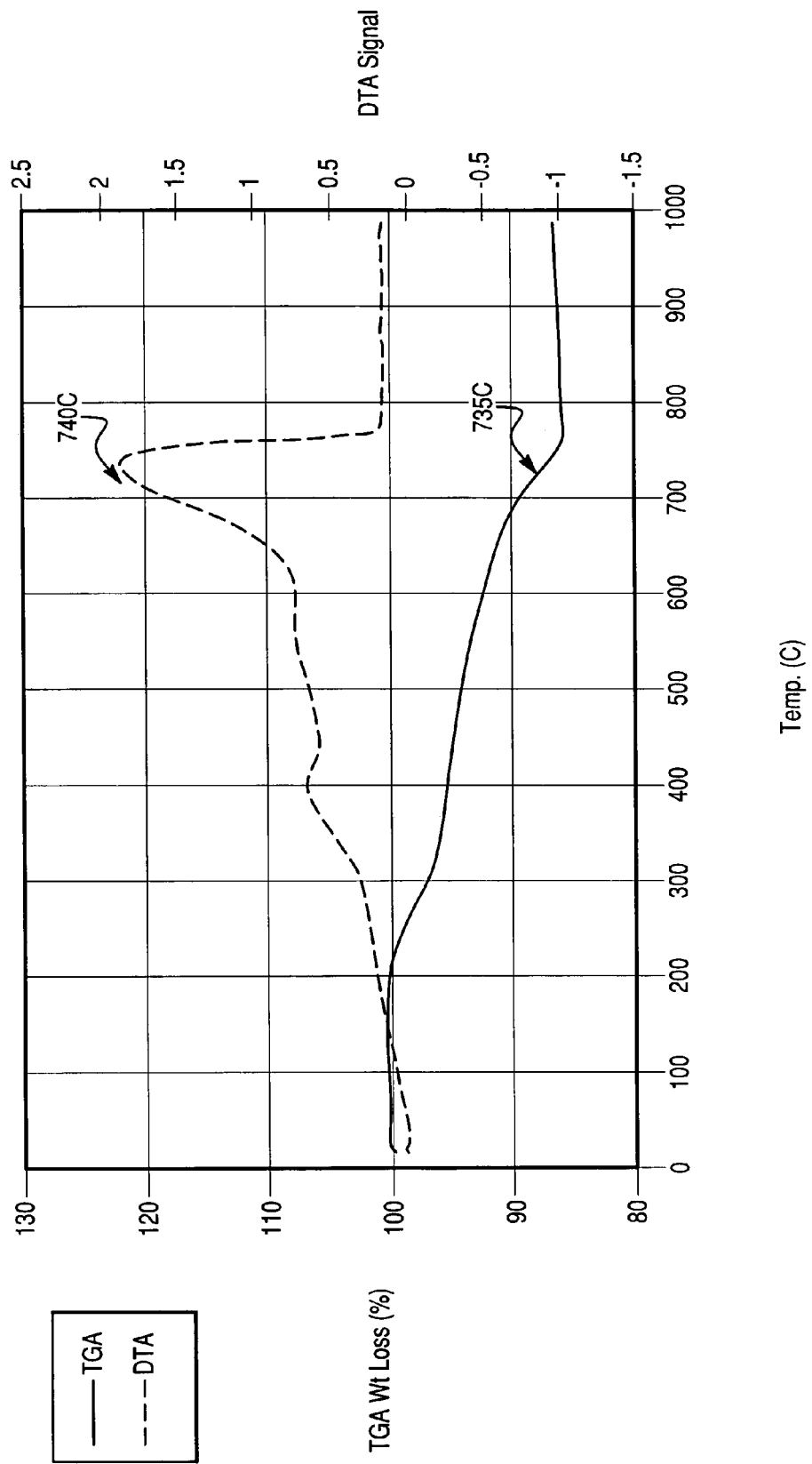

To exemplify the results obtained from such TGA-DTA measurements, reference is made to FIG. 5, which shows the results of a catalyst test powder mixed with model particulate material P1 using air as the oxidizing gas. The curve corresponding to the TGA weight loss is shown as the solid curve. For the catalyst exemplified in FIG. 5, one weight loss and an exotherm is observed in a lower temperature range (150-400° C.) associated with the lube oil combustion, and a second weight loss and exotherm is observed in a higher temperature range (500-800° C.) associated with the combustion of the carbon black (CB in Table 2, below). Each of the two distinctive weight losses in the TGA curve has an "onset," "inflection," and "end" portion. The "inflection" point lies at the temperature associated with the highest rate of heat loss. Likewise, the exotherms in the DTA curve (shown as a dashed line) each have an "onset," "peak," and "end" point. The DTA peak point corresponds to the temperature of maximum heat evolution from the associated combustion process. Theses characteristic points in the TGA and DTA curves can be used as a figure-of-merit to assess the relative performance for different catalyst powders. For the results shown in Table 2, below, TGA onset and inflection temperatures will be identified when they can be clearly determined for relative performance. Further, for DTA responses, the onset and peak temperatures will be used when they can be clearly discerned from the curves.

First Set of Evaluations Conducted Using Flowing Air (20% $O_2$) as the Oxidizing Gas and Model Particulate Material P1

The catalyst powders screened in the first set included catalyst powder A, catalyst powder B, catalyst powder C, catalyst powder D and control powder A. In Table 1, below, the compositions for the catalyst powders are summarized, and in Table 2, below, the TGA-DTA results are summarized. The TGA-DTA curves generated in each of the trials are found in FIGS. 6-10.

TABLE 1

| Test Powder | Oxide Composition | $CeO_2$ | $ZrO_2$ | $La_2O_3$ | Cordierite |
|---|---|---|---|---|---|
| A | $CeO_2$ | 100 | | | |
| B | $CeO_2$—$ZrO_2$ | 70 | 30 | | |
| C | $CeO_2$—$ZrO_2$—$La_2O_3$ | 55 | 15 | 30 | |
| D | $CeO_2$—$ZrO_2$—$Pr_6O_{11}$ | 55 | 15 | 30 | |
| Control Powder A | Cordierite Powder | | | | 100 |

TABLE 2

| | TGA Temp. (° C.) | | | DTA Temp. (° C.) | | |
|---|---|---|---|---|---|---|
| Test Powder | CB Onset | CB Inflection | Lube Peak | CB Onset | CB shoulder | CB peak |
| A | 495 | 591 | 242 | 440 | 526 | 599 |
| B | 494 | 617 | 227 | 420 | 530 | 607 |
| C | 543 | 631 | 296 | 466 | none | 621 |
| D | 476 | 541 | 309 | 419 | none | 541 |
| Control Powder A | 584 | 667 | none | 530 | none | 684 |

From Table 2 it can be seen that all of the test catalyst powders exhibited lower characteristic TGA-DTA temperature for carbon black (CB) oxidation than did control powder A (containing cordierite powder). The catalyst powders, therefore, all showed a discernible catalytic effect. Furthermore, the test sample mixtures containing test catalyst powders also showed activity for lube oil combustion (DTA peak), whereas the test sample mixture containing the non-catalytic control powder did not exhibit a lube oil exotherm, indicating that no oxidation had occurred. In the trial conducted with the test sample mixture containing the control (cordierite), the lube oil weight loss was due essentially to volatilization.

For the trials conducted with test sample mixtures containing catalyst test powders, test catalyst powder D (containing $CeO_2$—$ZrO_2$—$Pr_6O_{11}$) exhibited the lowest TGA temperature responses of any of the test catalyst powders for carbon black combustion (CB onset =476° C., CB inflection =541° C.). These values were lower by 108° C. and 126° C., respectively, compared with those obtained using the cordierite control. This comparison showed a clear catalytic effect for test catalyst powder D.

The main DTA responses showed that catalyst powder D and catalyst powder B ($CeO_2$—$ZrO_2$) exhibited the lowest CB onset temperatures of 419° C. and 420° C., respectively. These values were about 110°C. lower than the results obtained for the test sample mixture containing the cordierite control powder. Catalyst test powder A exhibited the lowest CB peak temperature for carbon black combustion (541° C.) of any of the test samples evaluated; however, the test sample mixture containing pure ceria (catalyst powder A) exhibited a shoulder for carbon black combustion at 526° C. The test sample mixture containing catalyst powder B showed the lowest DTA peak for lube oil oxidation (227° C.).

Catalyst powder C had a similar composition to catalyst powder D, with the exception of $La_2O_3$ being substituted for $Pr_6O_{11}$. The results for the TGA-DTA carbon black oxidation for catalyst powder C were not nearly as good as the results obtained with catalyst powder D. This data provides strong evidence that the $Pr_6O_{11}$ has a significant role in the enhanced burning of the soot fraction associated with catalyst powder D.

Of the catalyst powders tested, catalyst powder D was judged to exhibit the best overall performance for lube oil and carbon black combustion in air. While not being bound by theory, it is believed that its enhanced performance relative to the catalyst powders tested is due to the presence of the $Pr_6O_{11}$, which has very high lattice oxygen mobility. It is believed that a significant component of the oxidation function of these metal oxide catalysts is associated with their capability to transfer oxygen to the particulate to contribute to its oxidation.

Second Set of Evaluations Conducted Using Model Particulate Material P2 and Oxidizing Gas of: (1) Helium/Air (50:50, 10% $O_2$), or (2) Helium-$NO_2$/Air (5000 ppm $NO_2$, 10% $O_2$).

In these trials, model particulate material P2 provided a material that more closely exemplified real engine particulate. In addition, the composition of the oxidizing gases used in the second set of trials more closely resembled the lower $O_2$ concentration seen in typical diesel engine exhaust compositions. The $NO_2$ was included with the $O_2$ to assess the effect of this particular oxidant on the particulate oxidation. TGA-DTA trials were conducted on catalyst powder A, catalyst powder B, catalyst powder D, catalyst powder E and control powder A. Each of the powders was evaluated in both helium/air and helium-$NO_2$/air.

The TGA-DTA results for the test sample mixtures conducted with the catalyst powders can be found in Table 3, below. The TGA-DTA curves for the individual trials that use helium/air as the oxidizing gas can be found in FIGS. 11-15, while the curves for the trials conducted with helium-$NO_2$/air can be found in FIGS. 16-20.

trials conducted with catalyst powder D exhibited the lowest DTA soot peak temperature (524° C.) of any of the candidates tested under these conditions. With the presence of the $NO_2$ in the oxidizing gas, the DTA soot peak temperatures for the catalyst test powders were all in the range of 524-578° C. Catalyst powder E exhibited the lowest estimated TGA soot inflection temperature (500° C.). The TGA soot inflection temperatures all fell in the range of 500-535° C. The inclusion of $NO_2$ in the oxidizing gas mixture did not appear to have any significant effect on the DTA or TGA soot oxidation temperatures with control powder A (containing cordierite powder). This observation is consistent with the general effect of $NO_2$ improving (lowering characteristic DTA-TGA temperatures) the soot oxidation performance of the catalyst powders.

Based on the TGA-DTA results, it was concluded that catalyst powder D containing $CeO_2$—$ZrO_2$—$Pr_6O_{11}$ was a good candidate for use as part of a catalyst composition for regeneration of catalyzed diesel soot filters.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. An exhaust article comprising at least one upstream filter in communication with at least one downstream filter, the upstream filter comprising an open cell foam filter having an upstream catalyst composition dispersed thereon, wherein the upstream catalyst composition comprises an upstream co-formed ceria-zirconia composite;

the downstream filter comprising a downstream catalyst composition dispersed thereon, wherein the downstream catalyst composition comprises a downstream co-formed ceria-zirconia composite; and wherein the upstream filter is at least as porous as the downstream filter and said upstream and/or downstream co-formed ceria-zirconia composite comprises 30 to 95 wt. % ceria, 5 to 50 wt. % zirconia and 10 to 60 wt. % praseodymia.

2. The exhaust article of claim 1 wherein the downstream filter is selected from the group consisting of a honeycomb wall flow filter; a wound or packed fiber filter, an open cell foam filter; a sintered metal powder filter; a sintered metal fiber filter; a perforated metal foil filter and a ceramic fiber composite filter.

TABLE 3

| | helium/air mixture Temp. (° C.) | | | helium-$NO_2$/air mixture Temp. (° C.) | | | |
|---|---|---|---|---|---|---|---|
| Test Powder | Lube DTA Peak | Soot DTA Peak | Soot DTA Sh. | Soot TGA Inflect. | Lube DTA Peak | Soot DTA Peak | Soot DTA Sh. | Soot TGA Inflect. |
| A | 248 | 685 | 507 | 604 | 234 | 545 | none | 520 |
| B | 279 | 727 | none | 700 | 267 | 578 | none | 535 |
| E | 223 | 682 | none | 670 | 268 | 541 | none | 500 |
| D | 309 | 501 | 638 | 590 | 313 | 524 | none | 520 |
| Control Powder A | none | 750 | none | 736 | none | 740 | none | 735 |

The results obtained using the helium-air oxidant show that the catalyst powders all oxidize the soot at temperatures lower than control powder A (cordierite). A catalytic effect is therefore seen for the catalyst powders. Of the catalyst powders tested, catalyst powder D (containing a co-formed ceria-zirconia composite containing praseodymium oxide) exhibited the lowest temperatures for DTA soot peak (501° C.) and estimated soot inflection (590° C.). Catalyst powder E, containing a mixture of platinum on gamma alumina and a co-formed ceria-zirconia composite exhibited the lowest Lube DTA peak temperature.

The results obtained using the helium-$NO_2$/air oxidant showed that for most of the catalyst powders, the DTA soot peak and TGA soot inflection temperatures were lowered by the presence of $NO_2$, which is known as a powerful oxidant. In some cases, the difference was greater than 140° C. relative to the helium-air oxidant. The only exception was the result obtained from the test mixture containing catalyst powder D, although the presence of the $NO_2$ caused only a slight increase in the DTA soot peak temperature. Notwithstanding, 3. The exhaust article of claim 1 wherein the upstream and/or downstream catalyst composition further comprises from 0.01 to 200 g/ft$^3$ of a platinum group metal component.

4. The exhaust article of claim 1 wherein the upstream filter is more porous than the downstream filter.

5. The exhaust article of claim 1 wherein the upstream open cell filter has a porosity of from 1 to 10 ppi.

6. The exhaust article of claim 5 wherein the downstream filter is a honeycomb wall flow filter.

7. The exhaust article of claim 1 wherein the downstream filter is an open cell foam filter.

8. The exhaust article of claim 1 wherein the downstream open cell foam filter has the same porosity as the upstream open cell foam filter.

9. The exhaust article of claim 7 wherein the downstream open cell foam filter is less porous than the upstream open cell foam filter.

10. An exhaust article for reducing harmful exhaust emissions from diesel engines comprising: at least one upstream filter in communication with at least one downstream filter, at least one of said upstream filter or said downstream filter being a perforated metal foil filter, wherein the upstream filter is at least as porous as the downstream filter, at least one of said upstream filter or said downstream filter having a catalyst composition comprising 30 to 95 wt. % ceria, 5 to 50 wt. % zirconia, and 10 to 60 wt. % praseodymia dispersed thereon.

11. The exhaust article of claim 10 wherein the upstream and/or downstream catalyst composition further comprises from 0.01 to 200 g/ft$^3$ of a platinum group metal component.

12. A method of treating the exhaust stream from a diesel engine comprising passing said exhaust stream through an exhaust article comprising at least one upstream filter in communication with at least one downstream filter,
    the upstream filter having an upstream catalyst composition dispersed thereon, wherein the upstream catalyst composition comprises an upstream co-formed ceria-zirconia composite,
    the downstream filter comprising a downstream catalyst composition dispersed thereon, wherein the downstream catalyst composition comprises a downstream co-formed ceria-zirconia composite, and
    wherein the upstream filter is at least as porous as the downstream filter, and said upstream and/or downstream co-formed ceria-zirconia composite comprises 30 to 95 wt. % ceria, 5 to 50 wt. % zirconia and 10 to 60 wt. % praseodymia.

13. The method of claim 12 wherein at least one of said upstream and downstream filters is a perforated metal foil filter.

14. The method of claim 12 wherein the downstream filter is a honeycomb wall flow filter.

15. The method of claim 12 wherein the downstream filter is an open cell foam filter.

* * * * *